US 10,124,655 B2

(12) United States Patent
Langevin

(10) Patent No.: US 10,124,655 B2
(45) Date of Patent: Nov. 13, 2018

(54) RETRACTABLE ROOF VEHICLE SYSTEM AND METHOD

(71) Applicant: TRACKER MARINE, L.L.C., Springfield, MO (US)

(72) Inventor: Travis Edward Langevin, Springfield, MO (US)

(73) Assignee: TRACKER MARINE, L.L.C., Springfield, MO (US)

( * ) Notice: Subject to any disclaimer, the term of this patent is extended or adjusted under 35 U.S.C. 154(b) by 68 days.

(21) Appl. No.: 15/169,666

(22) Filed: May 31, 2016

(65) Prior Publication Data

US 2016/0361981 A1    Dec. 15, 2016

Related U.S. Application Data

(60) Provisional application No. 62/173,276, filed on Jun. 9, 2015.

(51) Int. Cl.
*B60J 7/06* (2006.01)

(52) U.S. Cl.
CPC .................................. *B60J 7/061* (2013.01)

(58) Field of Classification Search
CPC ..... B60J 7/026; B60J 7/04; B60J 7/041; B60J 7/047; B60J 7/06; B60J 7/061
USPC ............ 296/107.09, 107.11, 107.13, 107.15, 296/107.19, 107.2
See application file for complete search history.

(56) References Cited

U.S. PATENT DOCUMENTS

| | | | | |
|---|---|---|---|---|
| 3,501,783 A * | 3/1970 | Broadman | .............. | E04H 4/082 4/500 |
| 3,649,072 A * | 3/1972 | Cross | ...................... | B60J 7/041 296/100.03 |
| 4,547,014 A * | 10/1985 | Wicker | .................... | B60J 7/065 160/84.06 |
| 4,893,868 A * | 1/1990 | Miller | ..................... | B60J 7/061 296/219 |
| 6,220,657 B1 * | 4/2001 | Rea | ........................... | B60J 7/04 296/216.03 |
| D569,333 S * | 5/2008 | Hartford | ....................... | D12/16 |
| 7,438,345 B2 * | 10/2008 | Mrotek | ................. | B60J 7/1226 296/116 |
| 7,677,634 B2 * | 3/2010 | Flynn | .................... | B60J 7/1226 296/107.09 |
| 2006/0267379 A1 * | 11/2006 | Johnson | .................... | B60J 7/04 296/190.08 |

(Continued)

*Primary Examiner* — Hilary L Gutman
(74) *Attorney, Agent, or Firm* — Pillsbury Winthrop Shaw Pittman LLP

(57) ABSTRACT

The present disclosure relates to a retractable roof vehicle system. The system comprises an open sided vehicle having an occupant space for one or more occupants of the vehicle; a cover configured to at least partially shield the occupant space from ambient environmental conditions, the cover positioned over the occupant space of the vehicle, the cover configured to be moved between an open position and a closed position over the occupant space; and a frame coupled with the vehicle configured to support the cover over the occupant space, the frame comprising a first side rail and a second side rail positioned along opposing sides of the vehicle over the occupant space, the first and second side rails both forming cover guides configured to guide movement of the cover between the open position and the closed position.

23 Claims, 23 Drawing Sheets

(56) References Cited

U.S. PATENT DOCUMENTS

2009/0102243 A1\* 4/2009 Fujishima ................ B60J 7/061
296/216.04

\* cited by examiner

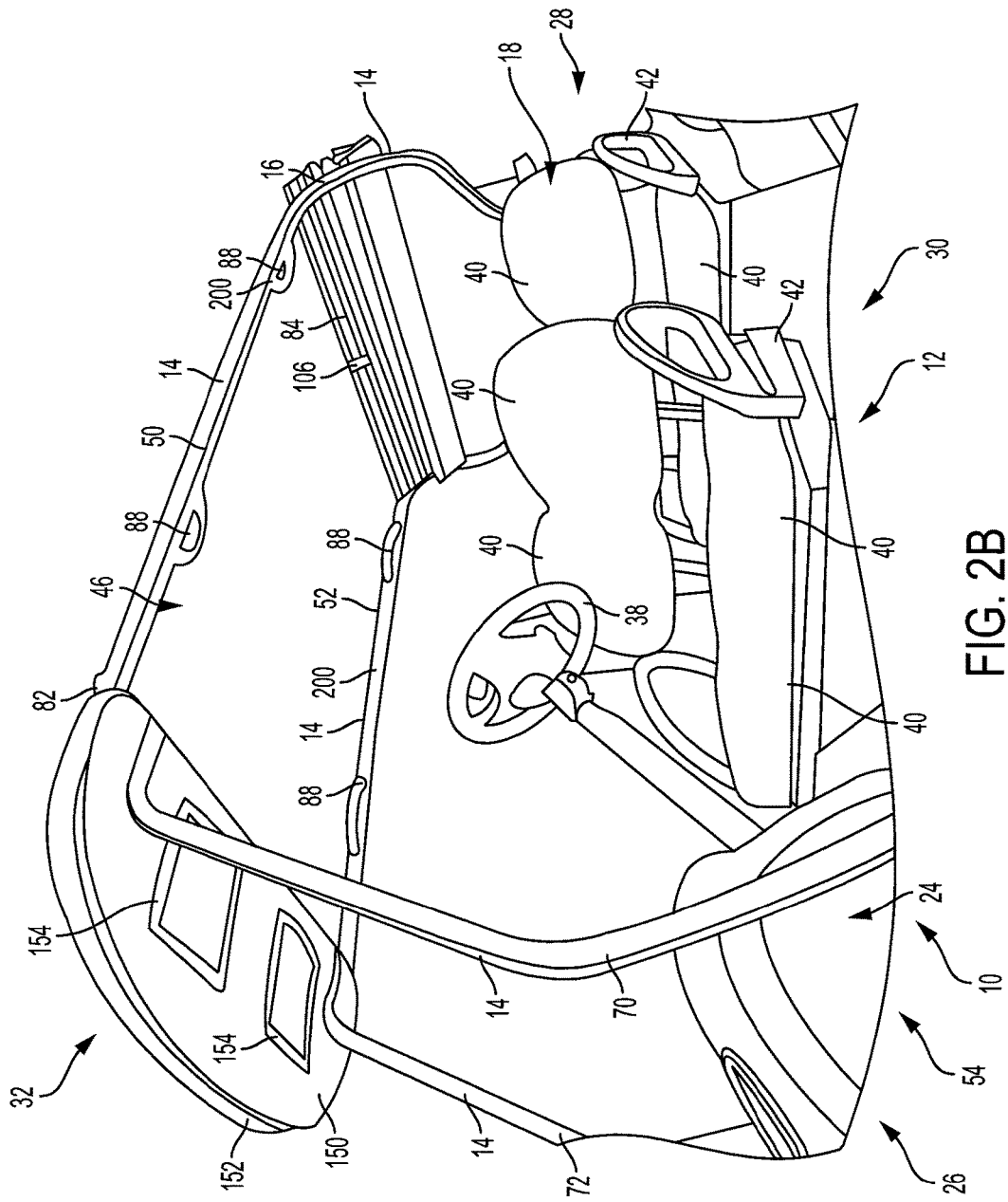

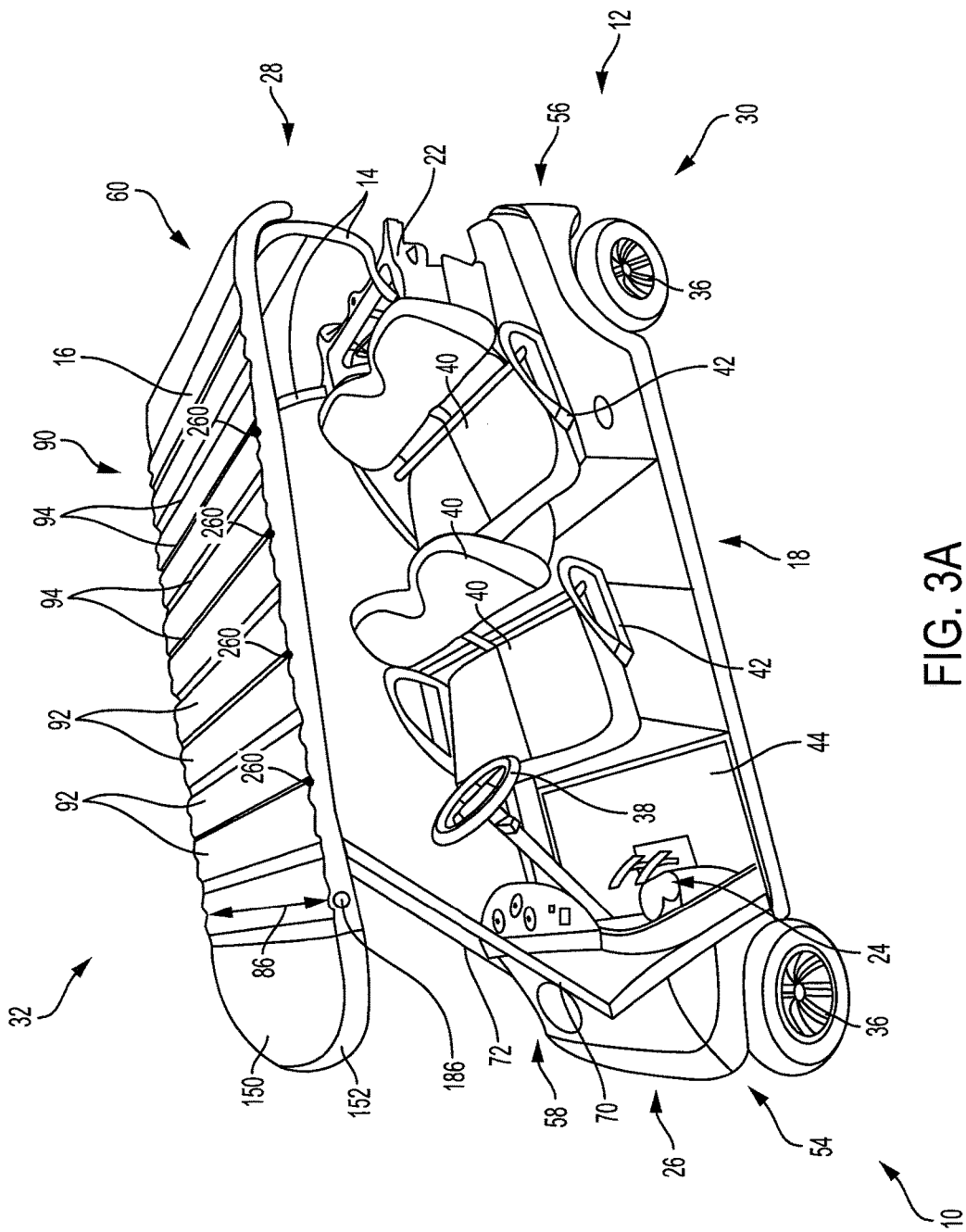

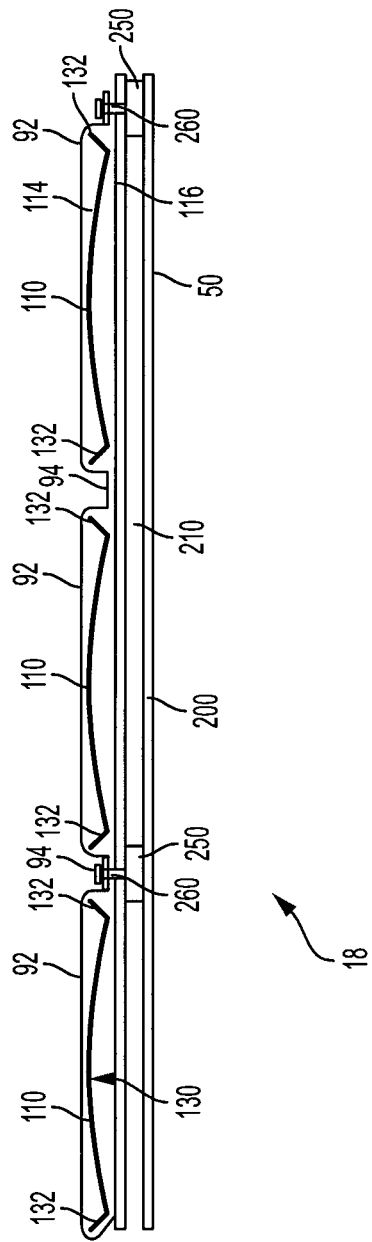

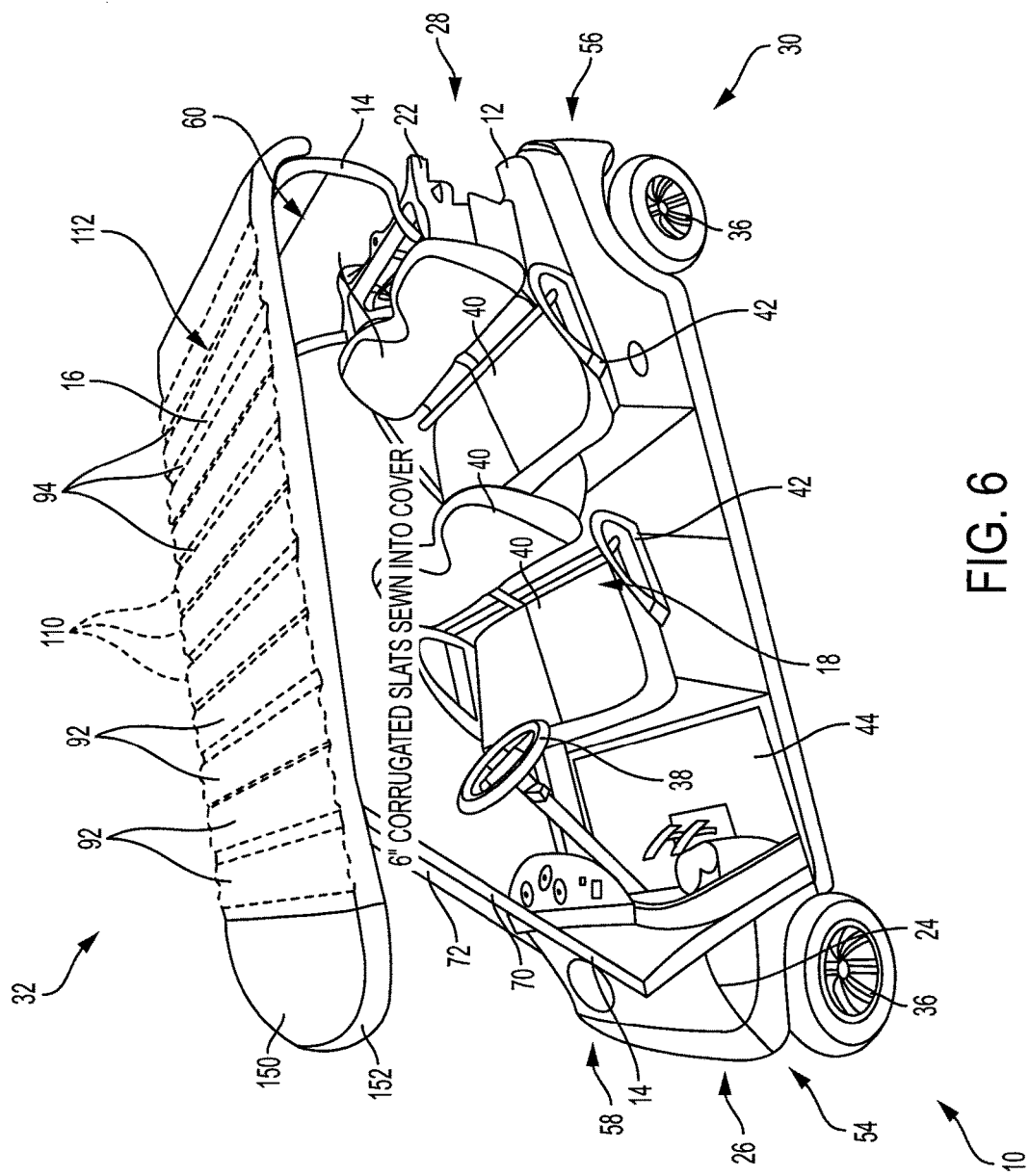

RETRACTABLE ROOF VEHICLE SYSTEM AND METHOD

CROSS-REFERENCE TO RELATED APPLICATIONS

This application claims benefit under 35 U.S.C. § 119(e) from U.S. Provisional Application No. 62/173,276, filed Jun. 9, 2015, which is incorporated herein by reference in its entirety.

BACKGROUND OF THE INVENTION

1. Field of the Invention

The present disclosure relates to a retractable roof vehicle system that includes a cover configured to be moved between an open position and a closed position over an occupant space of an open sided vehicle.

2. Description of Related Art

Golf carts, Club Cars, and all-terrain vehicles (ATV) are known. Typically, these vehicles either include or don't include a roof structure. When these vehicles do include a roof structure, the roof structure is a hard, permanent structure that is attached to the vehicle in a single position over an occupant space of the vehicle. Such roof structures provide shelter from environmental conditions and are not retractable and/or otherwise movable from a position above the occupant space at all.

SUMMARY OF EMBODIMENTS OF THE INVENTION

One aspect of the present disclosure relates to a retractable roof vehicle system. The system comprises an open sided vehicle, a cover, a frame, and/or other components. The open sided vehicle has an occupant space for one or more occupants of the vehicle. In some embodiments, the open sided vehicle is a golf cart, a Club Car, an all-terrain vehicle, and/or other vehicles. The cover is configured to at least partially shield the occupant space from ambient environmental conditions. The cover is positioned at least partially over the occupant space of the vehicle. The cover is configured to be moved between an open position and a closed position over the occupant space. The frame is coupled with the vehicle and configured to support the cover over the occupant space. The frame comprises a first side rail and a second side rail positioned along opposing sides of the vehicle over the occupant space. The first and second side rails both form and/or are coupled with cover guides configured to guide movement of the cover between the open position and the closed position.

In some embodiments, the cover and the frame include corresponding magnetic components configured to removably secure the cover in the closed position. In some embodiments, the first and second side rails are configured such that the cover guides are tracks formed in and/or coupled with the first and second side rails. One or more portions of the cover may ride within the tracks to facilitate movement of the cover between the open position and the closed position.

In some embodiments, the cover comprises two or more individual sections that extend from the first side rail to the second side rail. The individual sections may move in an accordion like motion along the first and second side rails toward or away from an end of the vehicle to facilitate movement of the cover between the open position and the closed position. In some embodiments, the cover comprises one or more channels formed between the individual sections. The channels may be substantially perpendicular to the first and second side rails. The channels may be configured to facilitate moisture removal from the cover toward the first and second side rails when the cover is in the closed position. In some embodiments, the individual sections include arcuate shaped structural elements. The arcuate shaped structural elements are configured to give the individual sections an arcuate shape and facilitate formation of the channels between the individual sections such that the cover has a corrugated appearance. In some embodiments, the cover comprises a first material layer, a second material layer, and the individual arcuate shaped structural elements. A given arcuate shaped structural element is positioned between the first material layer and the second material layer and extends from the first side rail to the second side rail in an individual section of the cover.

A second aspect of the present disclosure relates to a method for moving a retractable roof vehicle system between an open position and a closed position over an occupant space of an open sided vehicle. The retractable roof vehicle system comprises the open sided vehicle, a cover, a frame, and/or other components. The open sided vehicle may be a golf cart, an ATV, and/or other vehicles.

The method comprises positioning the cover over the occupant space of the vehicle, the occupant space being configured for one or more occupants of the vehicle, the cover configured to at least partially shield the occupant space from ambient environmental conditions, the cover configured to be moved between the open position and the closed position over the occupant space; coupling a frame with the vehicle, the frame configured to support the cover over the occupant space, the frame comprising a first side rail and a second side rail positioned along opposing sides of the vehicle over the occupant space, the first and second side rails both forming and/or being coupled with cover guides configured to guide movement of the cover between the open position and the closed position; and facilitating movement of the cover between the open position and the closed position over the occupant space.

In some embodiments, the method includes removably securing the cover in the closed position with corresponding magnetic components included in the cover and the frame. In some embodiments, the cover guides are tracks formed in and/or coupled with the first and second side rails and one or more portions of the cover ride within the tracks to facilitate movement of the cover between the open position and the closed position.

In some embodiments, the method comprises forming two or more individual sections in the cover that extend from the first side rail to the second side rail. The individual sections may move in an accordion like motion along the first and second side rails toward or away from an end of the vehicle to facilitate movement of the cover between the open position and the closed position. In some embodiments, one or more channels are formed in the cover between the individual sections. The channels are substantially perpendicular to the first and second side rails and configured to facilitate moisture removal from the cover toward the first and second side rails when the cover is in the closed position. In some embodiments, the individual sections include arcuate shaped structural elements. The arcuate shaped structural elements are configured to give the individual sections an arcuate shape and facilitate formation of the channels between the individual sections such that the cover has a corrugated appearance. In some embodiments, the cover comprises a first material layer, a second material layer, and the individual arcuate shaped structural elements. A given arcuate shaped structural element is positioned between the first material layer and the second material layer and extends from the first side rail to the second side rail in an individual section of the cover.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where:

FIG. 2B illustrates a second view of the system in an open position;
FIG. 3A illustrates a first view of the system in a closed position;
FIG. 5 illustrates a cross-sectional view of a first side rail of a frame of the system; individual sections of the cover, cover channels, and structural support elements of the cover;
FIG. 6 illustrates a vehicle, the frame, and the cover with the structural support elements in individual sections of the cover between the channels.

DETAILED DESCRIPTION OF EXEMPLARY EMBODIMENTS OF THE INVENTION

Figure 1:
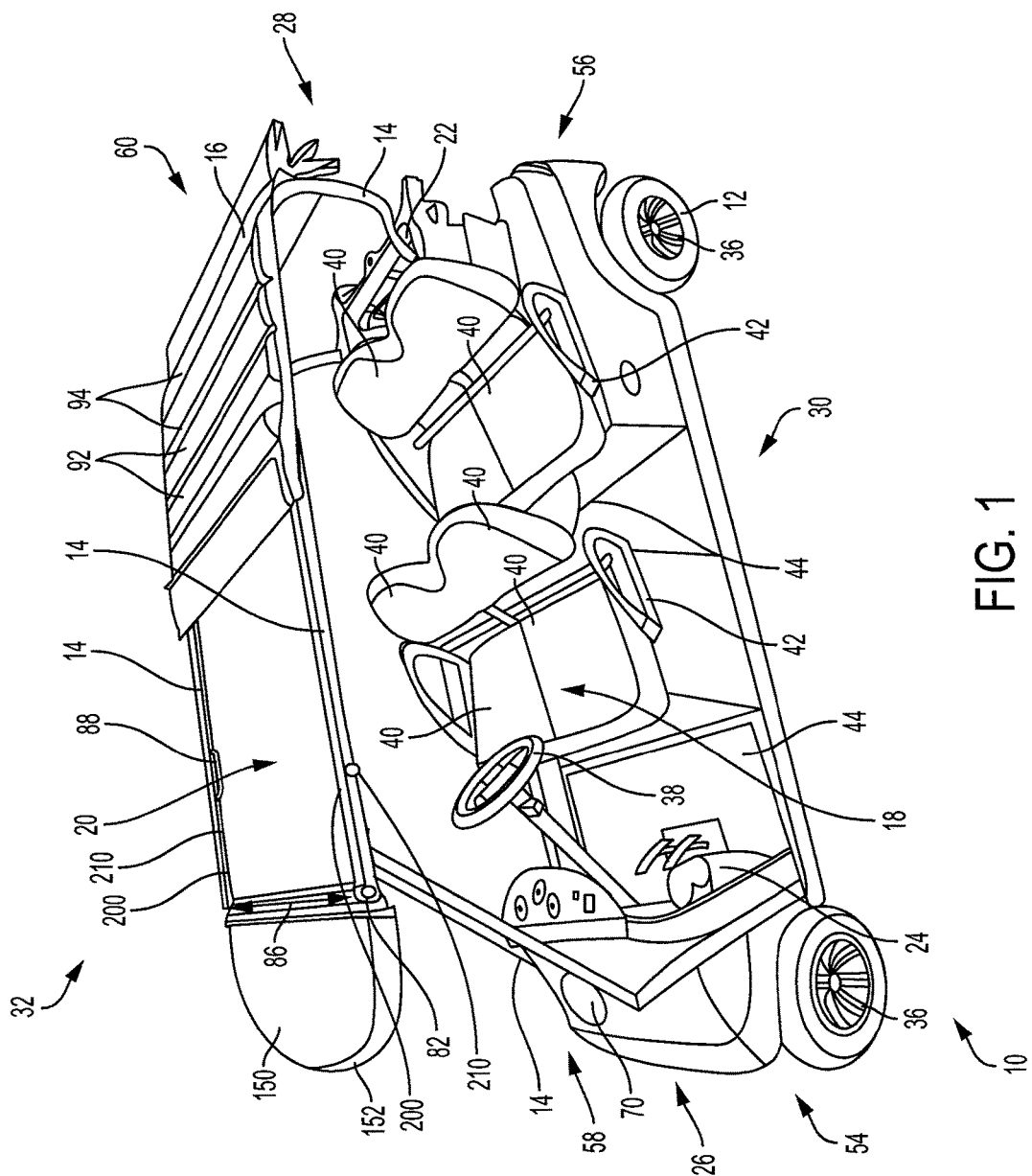
FIG. 1 illustrates a retractable roof vehicle system.

FIG. 1 illustrates a retractable roof vehicle system 10. System 10 comprises an open sided vehicle 12, a frame 14, a cover 16, and/or other components. System 10 is configured to move between open, partially open/closed, and closed positions. System 10 is illustrated in a partially open position 20 in FIG. 1, for example. System 10 is configured to at least partially shield and/or otherwise protect occupants in an occupant space 18 of vehicle 12 from ambient environmental conditions when system 10 is in a closed (and/or partially closed) position, while also giving the vehicle occupants the ability to enjoy such environmental conditions when system 10 is in an open (and/or partially open) position. System 10 is configured to be easily and conveniently moved between positions so that vehicle occupants can adjust an amount they are exposed to, and/or protected from, the environment while they use vehicle 12. For example, occupants of vehicle 12 may configure system 10 in an open position at the beginning of the day when the sun is out but the air is a comfortable temperature. Then, as the day gets warmer and/or rain develops, for example, the occupants may configure system 10 in a closed position to shade the vehicle occupants from the hot sun and or protect the occupants from rain.

Open sided vehicle 12 includes occupant space 18, a storage space 22, a drive mechanism 24, and/or other components. In some embodiments, open sided vehicle 12 is a golf cart, a Club Car, an ATV, a go cart, a windowless vehicle (e.g., a vehicle that has no glass, plastic and/or other clear window), and/or other vehicles. Open sided vehicle 12 includes a first end 26 (e.g., a front end), a second end 28 (e.g., a back end), two sides 30 (e.g., a driver side) and 32 (e.g., a passenger side) running from first end 26 to second end 28, and/or other portions. Storage space 18 may be configured to carry one or more objects transported by vehicle 12 and/or perform other functions. Storage space 22 is shown in FIG. 1 located at or near second end 28 of vehicle 12, but this is not intended to be limiting. Storage space 22 may include one or more storage spaces 22 located at any location in vehicle 12. Drive mechanism 24 may be configured to power and/or cause vehicle 12 to move. Drive mechanism 24 may include an engine, a battery, wheels 36, a steering wheel 38, and/or other components. Drive mechanism 24 may be generally located at or near first end 26 of vehicle 12 but this is not intended to be limiting. Drive mechanism may be located, and/or have one or more components that are located, anywhere in vehicle 12 that allows vehicle 12 to function as described herein. Occupant space 18 is configured for one or more occupants of vehicle 12. Occupant space may be configured for occupants who sit, stand, and/or have other postures in vehicle 12. Occupant space 18 may be generally bounded by first end 26, second end 28, first side 30, second side 32, and frame 14/cover 16. In some embodiments, occupant space 18 includes seats 40, handles 42, a floor 44, and/or other components. By way of a non-limiting example, FIG. 1 illustrates four seats 40 arranged in two rows in occupant space 18. Occupant space 18 is positioned between drive mechanism 24 toward first end 26 and storage space 22 toward second end 28, and between first side 30 and second side 32. It should be noted that the description of vehicle 12 as open sided is not intended to be limiting. Vehicle 12 may be any type of vehicle that allows system 10 to function as described herein.

Figure 2A:
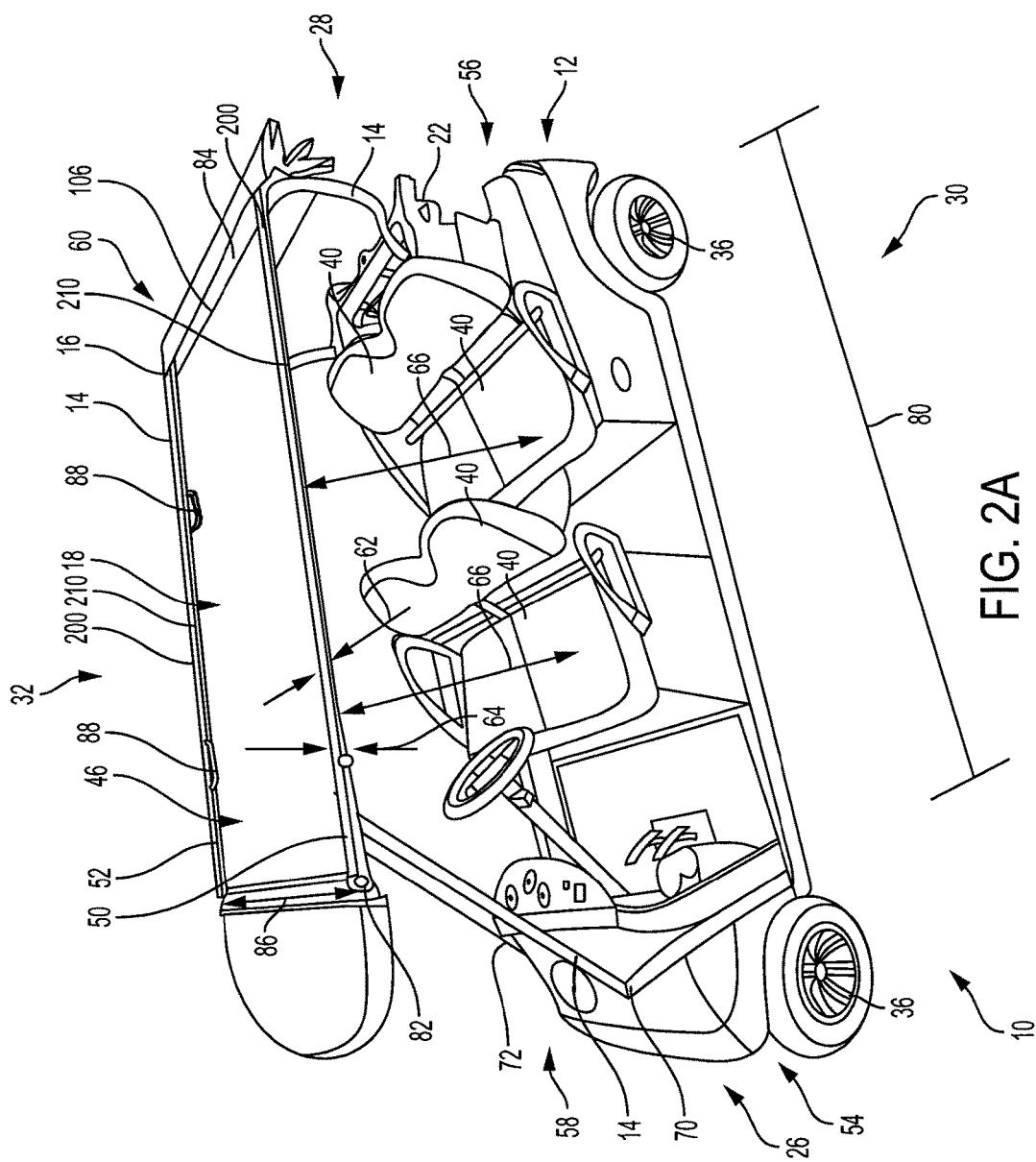
FIG. 2A illustrates a first view of the system in an open position.
Figure 2C:
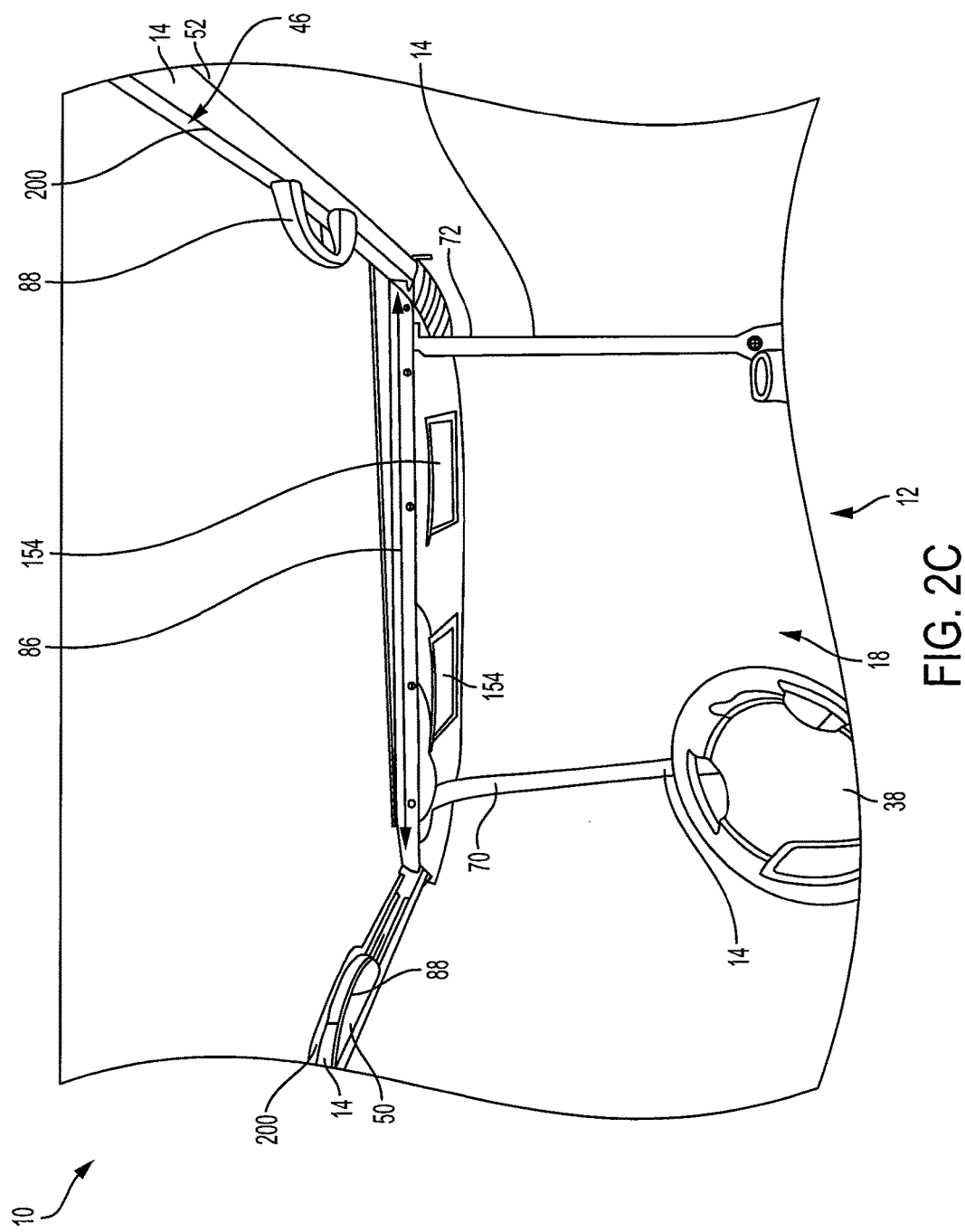
FIG. 2C illustrates a third view of the system in an open position.

FIGS. 2A, 2B, and 2C illustrate system 10 in an open position 46. Frame 14 is visible in FIGS. 2A, 2B, and 2C. Frame 14 is coupled with vehicle 12 and configured to support cover 16 over occupant space 18. Frame 14 comprises a first side rail 50 and a second side rail 52 positioned along opposing sides 30 and 32 of vehicle 12 over occupant space 18 and/or other components (e.g., as described below). In some embodiments, first side rail 50 is coupled with vehicle 12 at or near a first corner 54 and/or a second corner 56 of vehicle 12. Second side rail 52 is coupled with vehicle 12 at or near a third corner 58 and/or a fourth corner 60 of vehicle 12. Side rails 50 and 52 may be coupled with corners 54, 56, 58, and/or 60 with screws, nuts, bolts, clamps, clips, adhesive, welding components, and/or other coupling devices. In some embodiments, side rails 50 and 52 may have substantially square, rectangular, and/or other cross-sectional shapes. Side rails 50 and 52 may have a cross-sectional length 62 and/or and a cross sectional width 64 of up to about 1.5 inches. In some embodiments, cross-sectional length 62 and/or cross sectional width 64 may be between about 0.5 and about 1.5 inches. In some embodiments, cross-sectional length 62 and/or cross sectional width 64 may be about 1.25 inches. In some embodiments, side rails 50 and 52 and/or other components of frame 14 are formed from steel, aluminum, one or more polymers, and/or other materials. In some embodiments, side rails 50 and 52 and/or other components of frame 14 are coated (e.g., powder coated), painted, and/or have their surfaces treated in other ways.

Side rail 50 extends from vehicle 12 at or near second end 28 and corner 56. Side rail 52 extends from vehicle 12 at or near second end 28 and corner 60. Side rails 50 and 52 extend from vehicle 12 along second end 28 toward corners 56 and 60 (side rail 50 extends toward corner 56 and side rail 52 extends toward corner 60) until they reach a height 66 above occupant space 18. Side rails 50 and 52 extend above occupant space 18 so that side rails 50 and 52 are located at height 66 above seats 40 of up to about 50 inches. In some embodiments, height 66 may be between about 30 inches and about 50 inches. In some embodiments, height 66 may be about 39 inches. At about height 66, side rails 50 and 52 turn and extend from at or near second end 28 toward first end 26. Side rail 50 extends generally along first side 30 and side rail 52 extends generally along second side 32 so that side rails 50 and 52 substantially follow an outer perimeter of vehicle 12 above occupant space 18. In some embodiments, side rails 50 and 52 include support members 70 and 72 configured to couple with vehicle 12 at or near corners 54 and 58 and support side rails 50 and 52 at about height 66 toward first end 26 of vehicle 12. In some embodiments, support members 70 and 72 may have arcuate and/or other shapes (e.g., as shown in FIGS. 2A and 2B). In some embodiments, side rails 50 and 52 extend at about height 66 from at or near second end 28 toward first end 26 for a distance 80 (FIG. 2A) of up to about 100 inches. In some embodiments, distance 80 may be between about 70 inches and about 100 inches. In some embodiments, distance 80 may be about 82 inches. In some embodiments, side rails 50 and 52 form and/or are coupled with handles 88 formed along side rails 50 and 52 above occupant space 18. In some embodiments, the locations of handles 88 correspond to the locations of seats 40. In some embodiments, side rails 50 and 52 are coupled via a cross members 82 and 84 extending between side rail 50 and side rail 52 substantially along first end 26 and second end 28 (e.g., with cross member 82 being located at or near first end 26 and cross member 84 being located at or near second end 28.) In some embodiments, cross members 82 and 84 have a length 86 of up to about 45 inches. In some embodiments, length 86 may be between about 35 inches and about 45 inches. In some embodiments, length 86 may be about 41 inches.

Figure 3B:
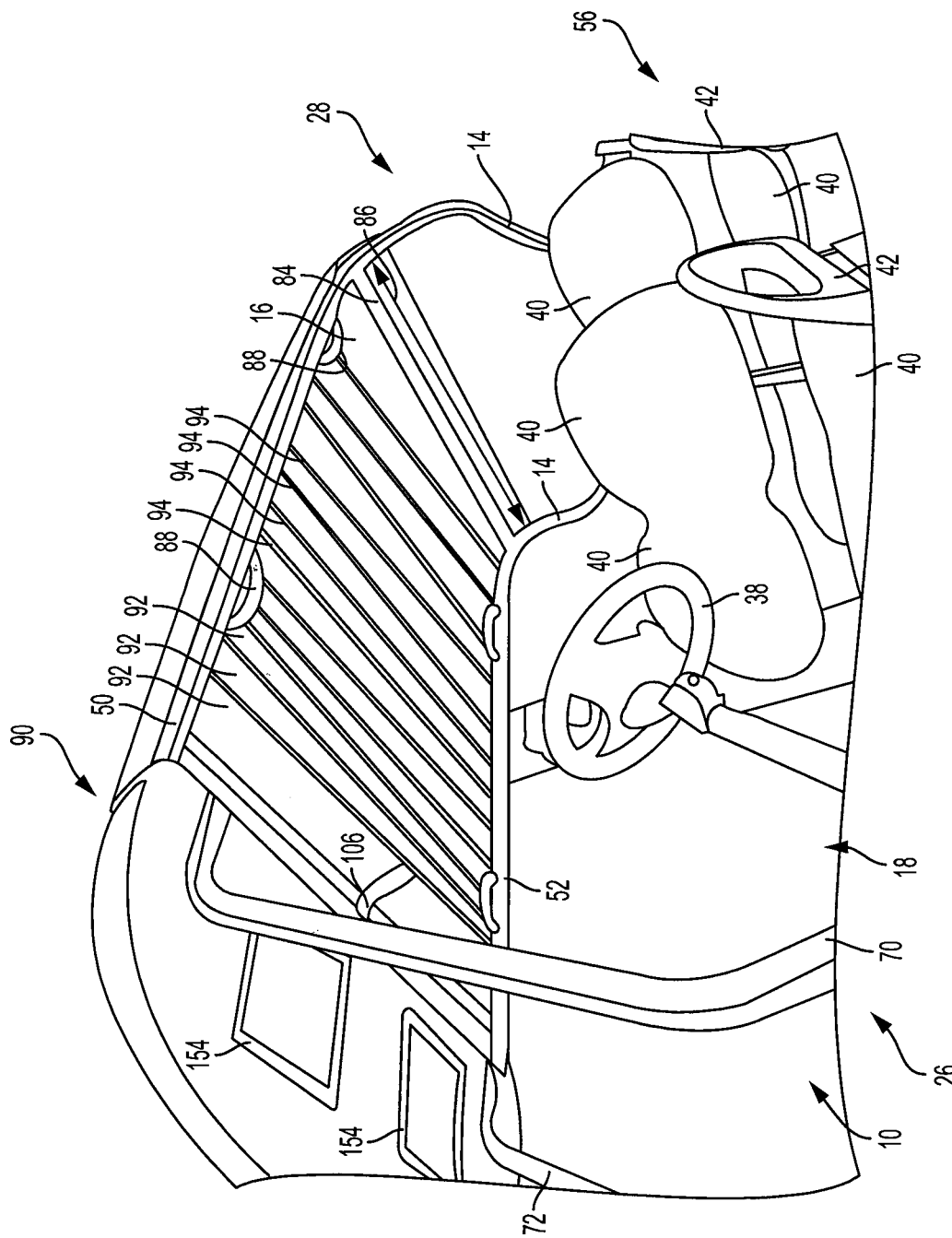
FIG. 3B illustrates a second view of the system in a closed position.
Figure 3C:
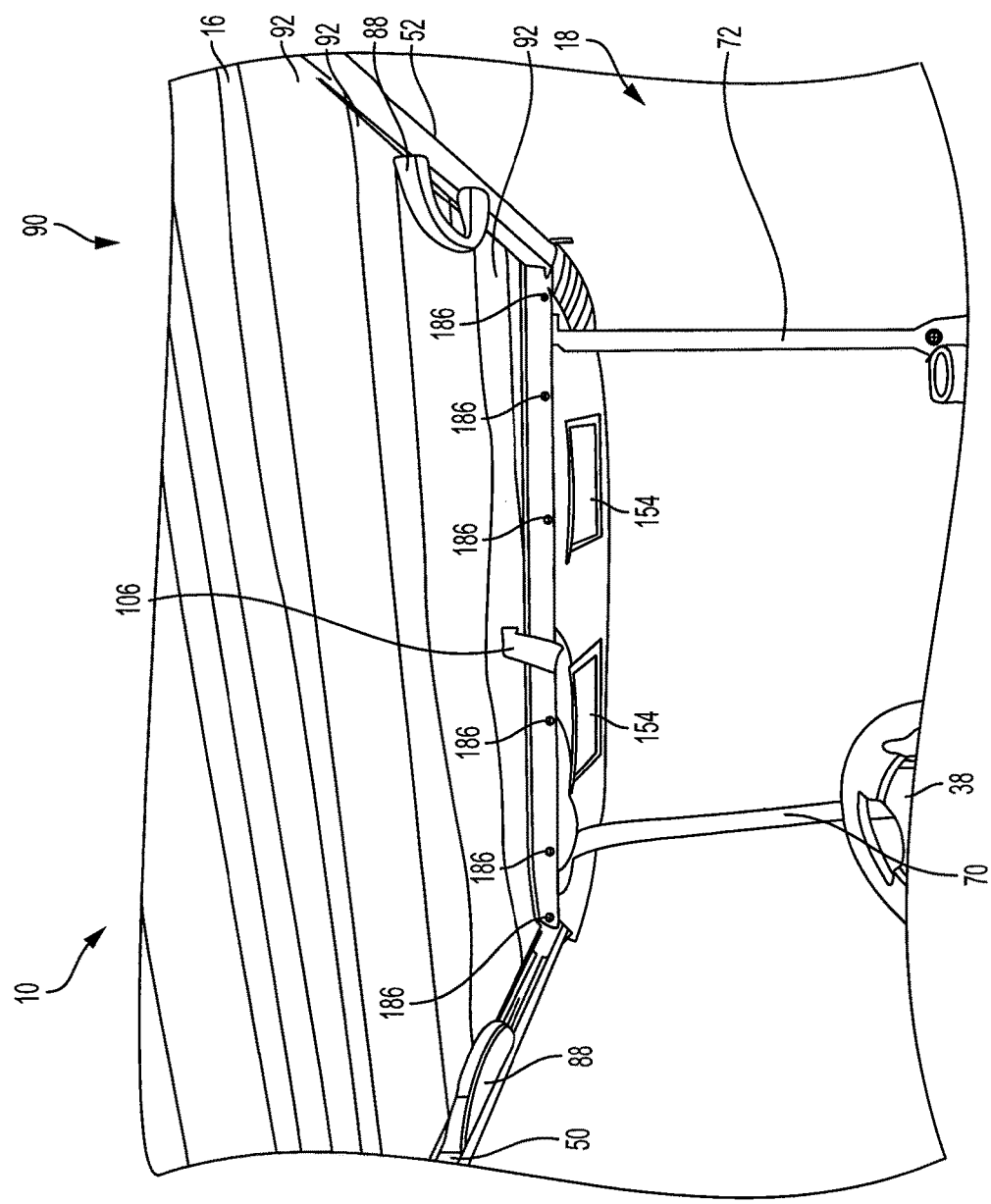
FIG. 3C illustrates a third view of the system in a closed position.

FIGS. 3A, 3B, and 3C illustrate system 10 in a closed position 90. Cover 16 is shown in FIGS. 3A, 3B, and 3C. Cover 16 is positioned over occupant space 18 of vehicle 12. Cover 16 is configured to at least partially shield occupant space 18 from ambient environmental conditions. Cover 16 is configured to be moved between open position 46 (shown in FIG. 2A, 2B, 2C) and closed position 90 over occupant space 18. In some embodiments, cover 16 comprises two or more individual sections 92 that extend from first side rail 50 to second side rail 52. In some embodiments, cover 16 comprises one or more channels 94 formed between individual sections 92. Channels 94 may be substantially perpendicular to first and second side rails 50, 52 and/or have other orientations that allow channels 94 to function as described herein. Channels 94 are configured to facilitate moisture removal from cover 16 toward first and second side rails 50, 52 when cover 16 is in closed position 90 (and/or when cover 16 is partially closed). Individual sections 92 may move in an accordion like motion (e.g., as shown in FIG. 1) and/or in other motions along first and second side rails 50 and 52 toward or away from an end 26, 28 of vehicle 12 to facilitate movement of cover 16 between open position 46 and closed position 90. Moving in an accordion like motion when cover 16 is moved to an open position (and/or a more open position) may include individual sections 92 folding and/or moving onto and/or adjacent to immediately previous (toward second end 28 of vehicle 12) individual sections 92 as the cover opens. Moving in an accordion like motion when cover 16 is moved to a closed position (and/or a more closed position) may include individual sections 92 unfolding and/or moving off of and/or away from immediately previous individual sections 92 as the cover closes.

Figure 4A:
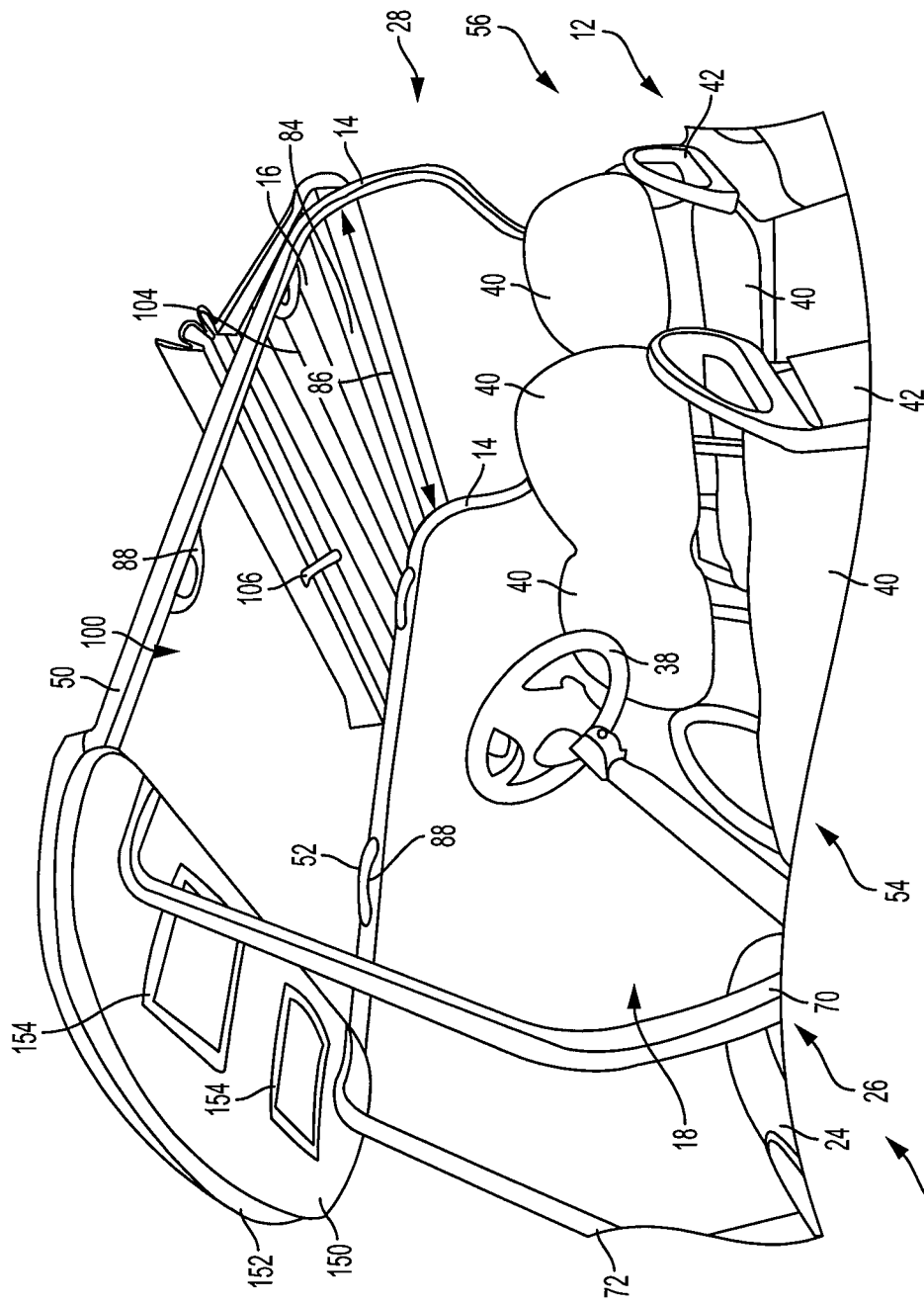
FIG. 4A illustrates a cover of the system in a first partially open/closed position.
Figure 4B:
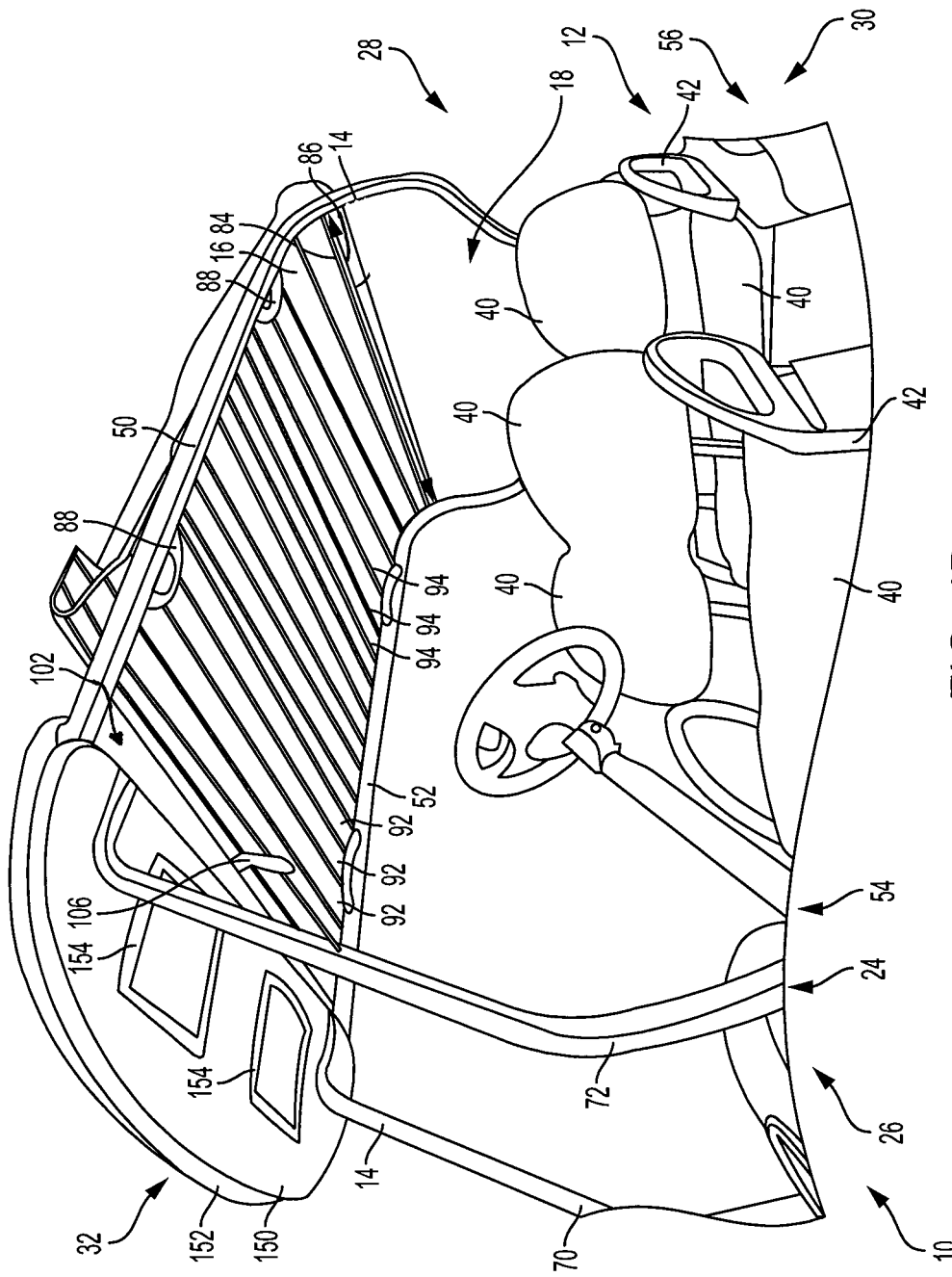
FIG. 4B illustrates the cover in a second partially open/closed position.

By way of two non-limiting examples, FIGS. 4A and 4B illustrate cover 16 in two different partially open/closed positions 100 (FIG. 4A), 102 (FIG. 4B). FIG. 4A illustrates cover 16 in an accordion like position 104 as it is moved toward and/or away from second end 28 of vehicle 12. FIG. 4B illustrates cover 16 in a more closed position relative to cover 16 shown in FIG. 4A. FIGS. 4A and 4B show strap 106 configured to be grasped by an occupant of vehicle 12 to open and/or close cover 16. Strap 106 may be sewn and/or otherwise coupled with cover 16 so that occupants of vehicle 12 may quickly and easily push and/or pull (for example) on cover 16 to move cover 16 along side rails 50 and 52 to close and/or open cover 16. Strap 106 may be and/or include a strip of fabric, a polymer material, and/or other straps. In some embodiments, cover 16 may include other components in addition to and/or instead of strap 106 that are configured to facilitate opening and/or closing cover 16. FIGS. 4A and 4B are not intended to be limiting. It should be noted that there are any number of partially open/closed positions cover 16 may take and FIGS. 4A and 4B are just two examples.

In some embodiments, individual sections 92 include arcuate shaped structural elements 110 as shown in FIG. 5 and FIG. 6. FIG. 5 illustrates a cross-sectional view of first side rail 50, individual sections 92, channels 94 and elements 110. FIG. 6 illustrates vehicle 12, frame 14, and cover 16 with elements 110 in individual sections 92 between channels 94. Arcuate shaped structural elements 110 are configured to give individual sections 92 an arcuate shape and facilitate formation of channels 94 between individual sections 92 such that cover 16 has a corrugated appearance 112.

In some embodiments, cover 16 comprises (as shown in FIG. 5) a first material layer 114, a second material layer 116, the individual arcuate shaped structural elements 110, and/or other components. In some embodiments, first material layer 114 and/or second material layer 16 may be formed from one or more of a fabric of woven polyester fibers, a fabric of woven acrylic fibers, water resistant and/or water proof fabrics, and/or other materials. In some embodiments, a given arcuate shaped structural element 110 may be between about 4 and about 8 inches wide. In some embodiments, a given arcuate shaped structural element 110 may be up to about 8 inches wide. In some embodiments, a given arcuate shaped structural element 110 may be about 6 inches wide. In some embodiments, elements 110 are positioned between first material layer 114 and second material layer 116 and extend from first side rail 50 to the second side rail 52 in an individual section 92 of cover 16. In some embodiments, elements 110 may be sewn between first material layer 114 and second material layer 116 and/or be positioned between first material layer 114 and second material layer 116 in other ways. In some implementations, elements 110 are formed from one or more polymers, metal, and/or other materials. Elements 110 may be formed via three dimensional printing, stamping, machining, molding, and/or other manufacturing methods. In some embodiments, arcuate shaped structural elements 110 have a radius of curvature 130 (shown in FIG. 5) of up to about 1.5 inches. In some embodiments, radius of curvature 130 is between about 1.0 inch and about 1.5 inches. In some embodiments, radius of curvature 130 is about 1.25 inches. In some embodiments, elements 110 include extension portions 132 (shown in FIG. 5) configured to facilitate formation of channels 94, and/or to function in other ways.

Figure 7:
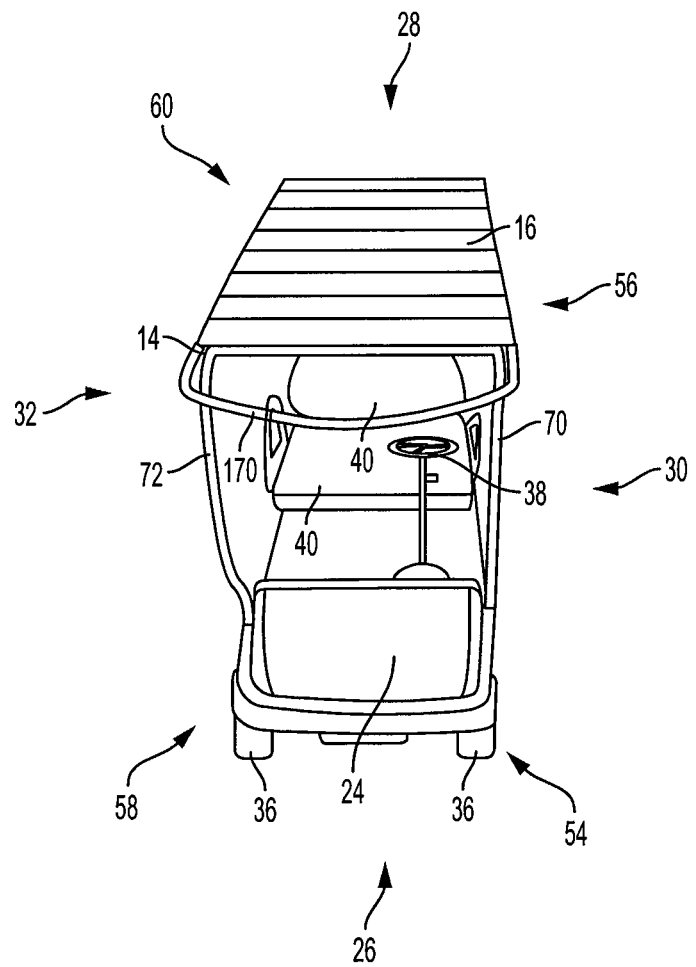
FIG. 7 illustrates a visor support portion of the frame with the cover in a closed position.

In some embodiments, cover 16 includes visor portion 150 (FIG. 6). Visor portion 150 is configured to at least partially shield occupants of vehicle 12 in occupant space 18 from the sun and/or other ambient environmental elements. Visor portion 150 extends from frame 14 at or near support members 70 and 72 toward first end 26 of vehicle 12. In some embodiments, visor portion 150 has a substantially semi-circular edge 152 that extends from frame 14 at or near support member 70 toward first end 26 of vehicle 12 and back toward frame 14 at or near support member 72. Visor portion 150 is supported by a visor support portion of frame 14 that similarly extends from frame 14 at or near support member 70 toward first end 26 of vehicle 12 and back toward frame 14 at or near support member 72. By way of non-limiting example, visor support portion 170 is shown in FIG. 7. FIG. 7 illustrates frame 14 with cover 16 in a closed position. As shown in FIG. 7, visor support portion 170 of frame 14 extends from frame 14 at or near support member 70 toward first end 26 of vehicle 12 and back toward frame 14 at or near support member 72. Returning to FIG. 6, in some embodiments, visor portion 150 includes pockets 154 (shown in FIG. 2B, 2C, 3B, 3C, 4A, 4B), and/or other features for vehicle 12 occupant convenience and/or for other purposes.

Figure 8:
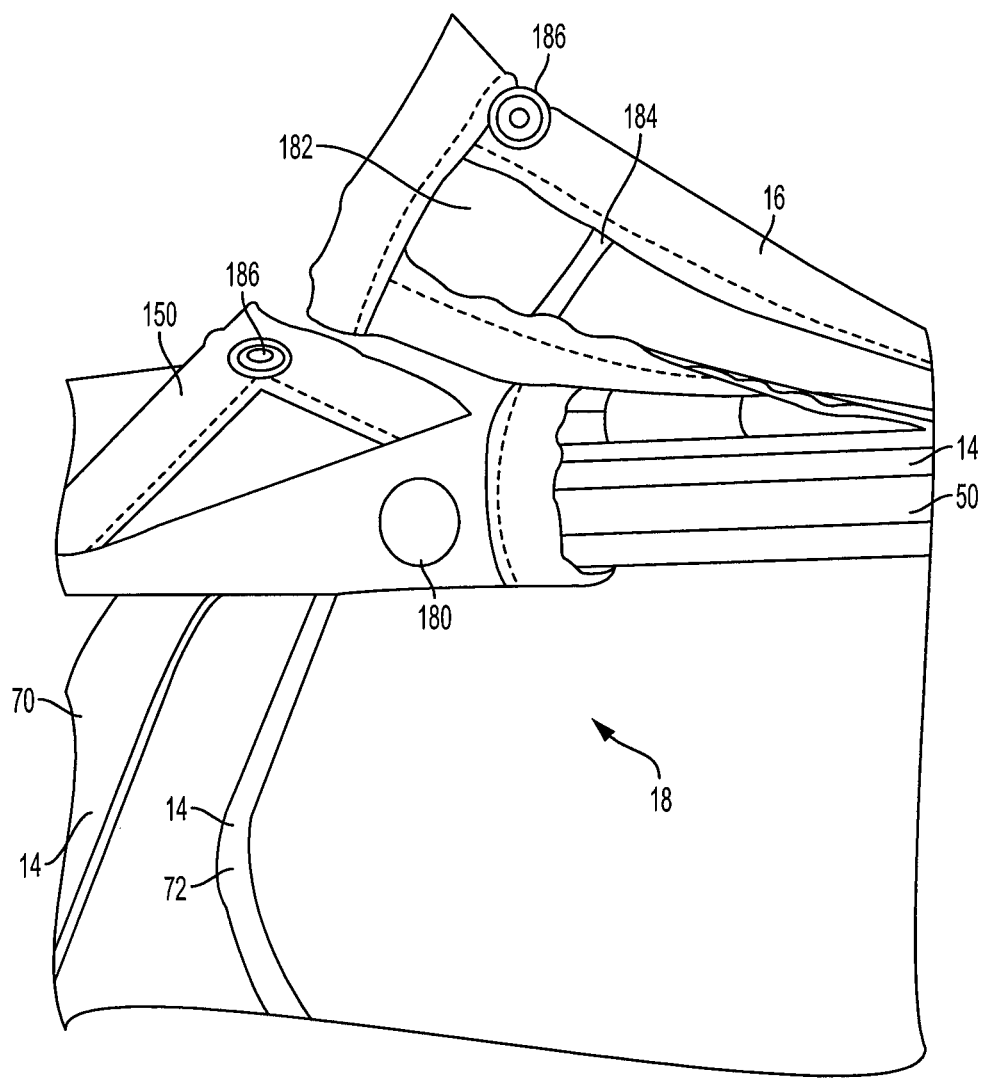
FIG. 8 illustrates the cover in a closed position but not secured by magnetic components.
Figure 9:
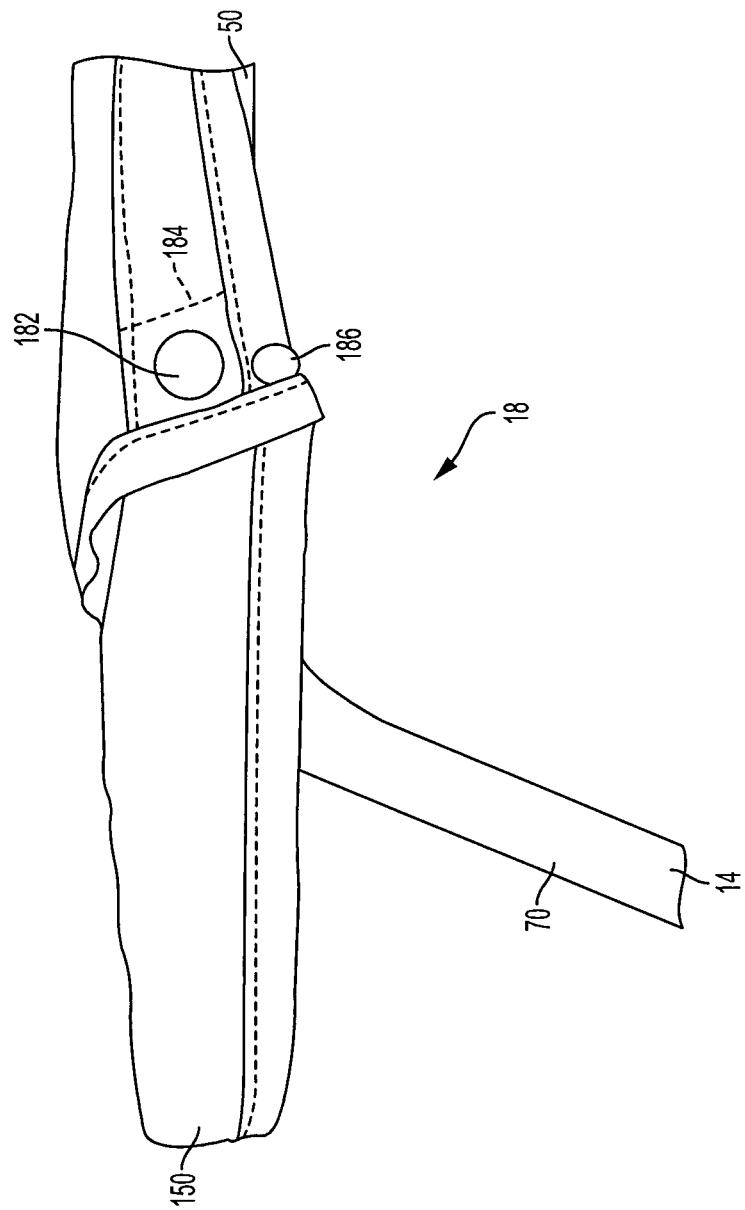
FIG. 9 illustrates the cover in a closed position and secured by magnetic components.

As shown in FIG. 8 and FIG. 9, in some embodiments, cover 16 and frame 14 include corresponding magnetic components 180, 182 and/or other components configured to removably secure cover 16 in a closed position. FIG. 8 illustrates cover 16 in a closed position but not secured by magnetic components 180, 182. FIG. 9 illustrates cover 16 in a closed position and secured by magnetic components 180, 182 (magnetic components 182 are not visible in FIG. 9). Responsive to cover 16 being closed by an occupant of vehicle 12, magnetic components 182 in cover 16 may be positioned to fold over magnetic components 180 coupled with frame 14 (FIG. 8). When cover 16 and magnetic components 182 have folded over frame 14 and magnetic components 180, magnetic attraction between magnetic components 182 and 180 removably secures cover 16 in the closed position. Magnetic components 180 are coupled with frame 14 via screws, nuts, bolts, clamps, fasteners, adhesive, and/or other coupling devices. Magnetic components 182 are sewn into and/or otherwise attached to cover 16. Magnetic components 180 and 182 are coupled with frame 14 and cover 16 and/or other components of system 10 such that they remain substantially stationary relative to cover 16 and/or frame 14 so that when cover 16 is in a closed position magnetic components 180 and 182 are substantially aligned to secure cover 16 in the closed position. For example, magnetic components 182 may be sewn into a pocket 184 in cover 16 sized for magnetic components 182 so that magnetic components cannot unintentionally move from the sewn pocket and will consistently align with magnetic components 180 when cover 16 is in a closed position.

In some embodiments, cover 16 may be removably secured in a closed position via coupling devices in addition to and/or other than magnetic components 180, 182. For example, FIG. 8 and FIG. 9 illustrate that cover 16 may be removably secured to visor portion 150 and/or frame 14 via buttons 186 and/or other coupling devices. Corresponding buttons 186 are located on cover 16 and visor portion 150 (FIG. 8). When magnetic components 182 in cover 16 fold over magnetic components 180 coupled with frame 14, corresponding buttons 186 may be coupled to secure cover 16 to visor portion 150 (in addition to frame 14 in this example).

FIG. 10-14 illustrate cover guides 200 configured to guide movement of cover 16 between an open position and a closed position. Cover guides 200 extend alongside rails 50 and/or 52 between first end 26 and second end 28 of vehicle 12. One or more portions of cover 16 may ride within cover guides 200 to facilitate movement of cover 16 between an open position and a closed position. In some embodiments, both first and second side rails 50 and 52 form and/or couple with cover guides 200. In some embodiments, first and second side rails 50 and 52 are configured such that cover guides 200 are tracks formed in and/or by first and second side rails 50 and 52. In some embodiments (e.g., as shown in FIG. 10-14), cover guides 200 are separate components coupled with side rails 50 and/or 52. In some embodiments, cover guides 200 are coupled with side rails 50 and/or 52 via screws, nuts, bold, clamps, fasteners, adhesive and/or other coupling components on a top side of side rails 50 and/or 52, but this is not intended to be limiting. Cover guides 200 may be coupled with side rails 50 and/or 52 via any coupling method and/or components, and cover guides 200 may be positioned on and/or in any surface of side rails 50 and/or 52 that allows cover guides 200 to function as described herein.

Figure 10:
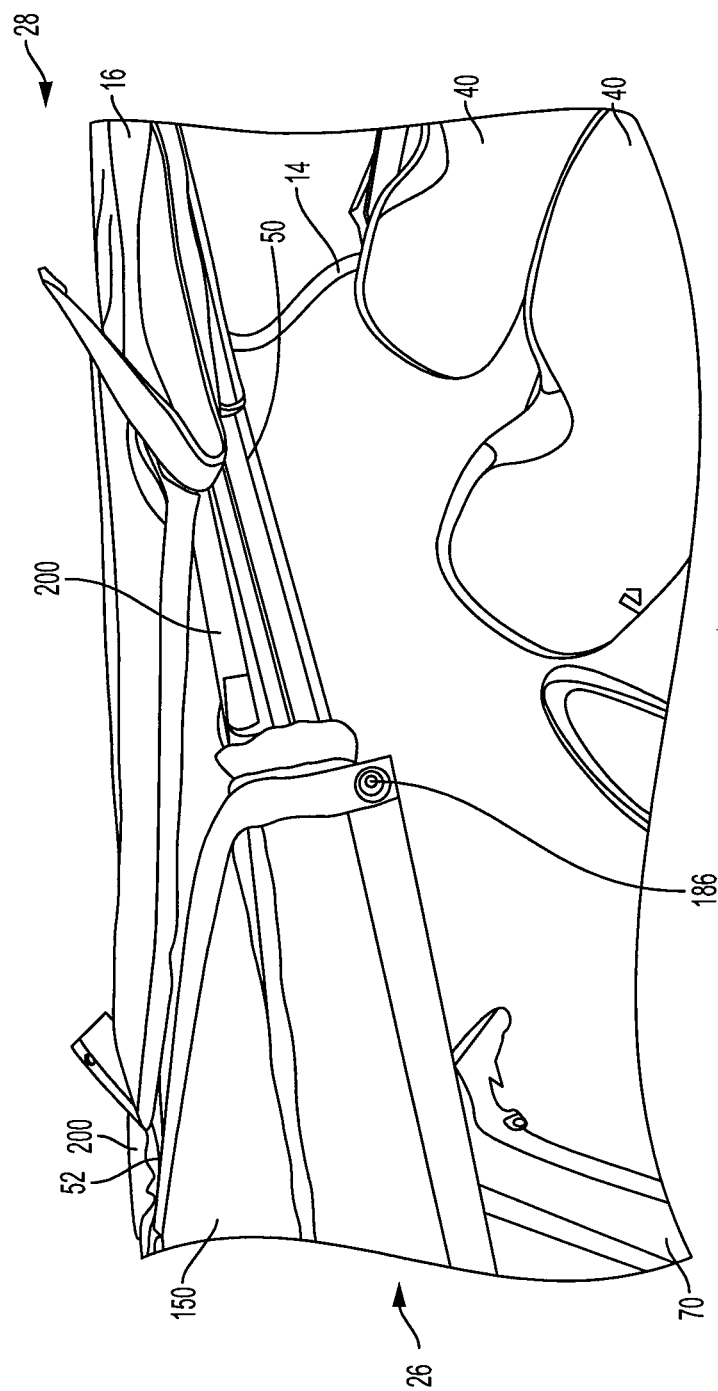
FIG. 10 illustrates the cover riding in cover guides with the cover in a partially closed position.
Figure 11:
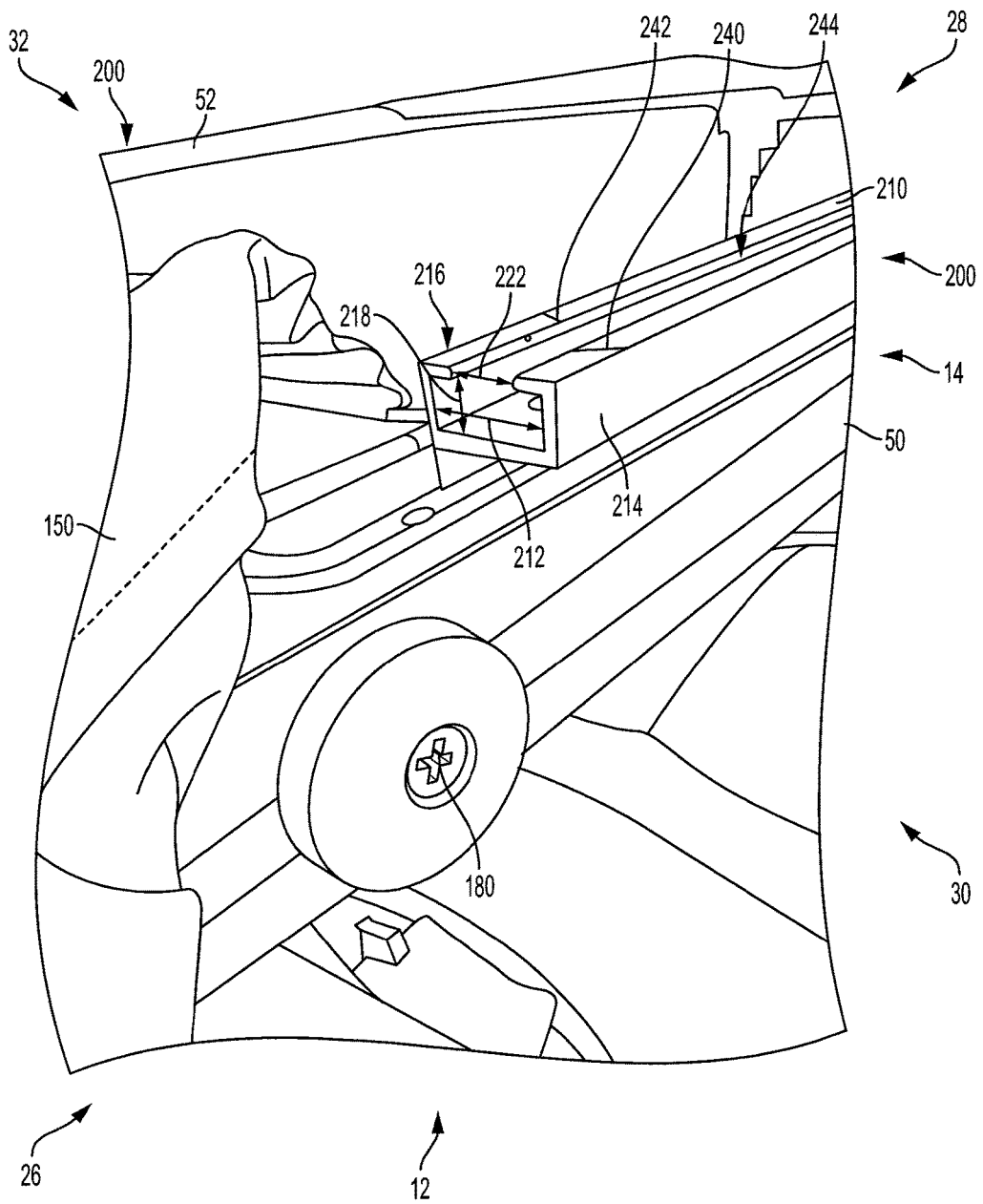
FIG. 11 illustrates a cover track included in a cover guide coupled with the first side rail of the frame.

FIG. 10 illustrates cover 16 riding in cover guides 200 with cover 16 in a partially closed position. Cover guides 200 are configured such that cover 16 moves (e.g., slides) back and forth toward and away from first end 26 and second end 28 of vehicle 12 along cover guides 200 (e.g., along first and second side rails 50 and/or 52 of frame 14). In some embodiments, cover guides 200 include cover tracks configured to guide cover 16. A cover track 210 included in a cover guide 200 coupled with first side rail 50 of frame 14 is illustrated in FIG. 11. (It should be noted that this configuration is repeated for a cover track 210 included in a cover guide coupled with second side rail 52 of frame 14.) In some embodiments, cover track 210 has a generally "U" shaped cross section (e.g., as shown in FIG. 11), and/or other cross sectional shapes. As shown in FIG. 11, cover track 210 has a transverse track width 212 (e.g., the base of the "U" shape which is adjacent to first side rail 50 (and/or second side rail 52)) of up to about 1 inch. In some embodiments, width 212 is between about 0.5 inches and about 1 inch. In some embodiments, width 212 is about 0.75 inches. Transverse track width 212 extends from a first side 214 of cover track 210 located toward first side 30 of vehicle 12 to a second side 216 of cover track 210 located toward second side 32 of vehicle 12. Sides 214 and 216 may form the sidewalls of the generally "U" shape of cover track 210. Cover track 210 has a track height 218 extending from at or near first side rail 50 toward cover 16 along sides 214 and 216 of up to about 0.5 inches. In some embodiments, height 218 is between about 0.25 inches and about 0.5 inches. In some embodiments, height 218 is about 0.375 inches. Cover track 210 has a slot width 222 of about up to about 0.5 inches. In some embodiments, width 222 is between about 0.25 inches and about 0.5 inches. In some embodiments, width 222 is about 0.375 inches. Slot width 222 is substantially parallel to transverse track width 212 and narrower than transverse track width 212 (e.g., slot width 222 is less than transverse track width 212). Slot width 222 is formed by edges 240, 242 of cover track 210 that extend from sides 214 and 216 above a channel space 244 created by the generally "U" shape of cover track 210. Track width 212, track height 218, and/or slot width 222 are configured such that cover track 210 may receive one or more track glides that are included in and/or coupled with cover 16, and facilitate movement of the track glides within cover track 210.

Figure 12:
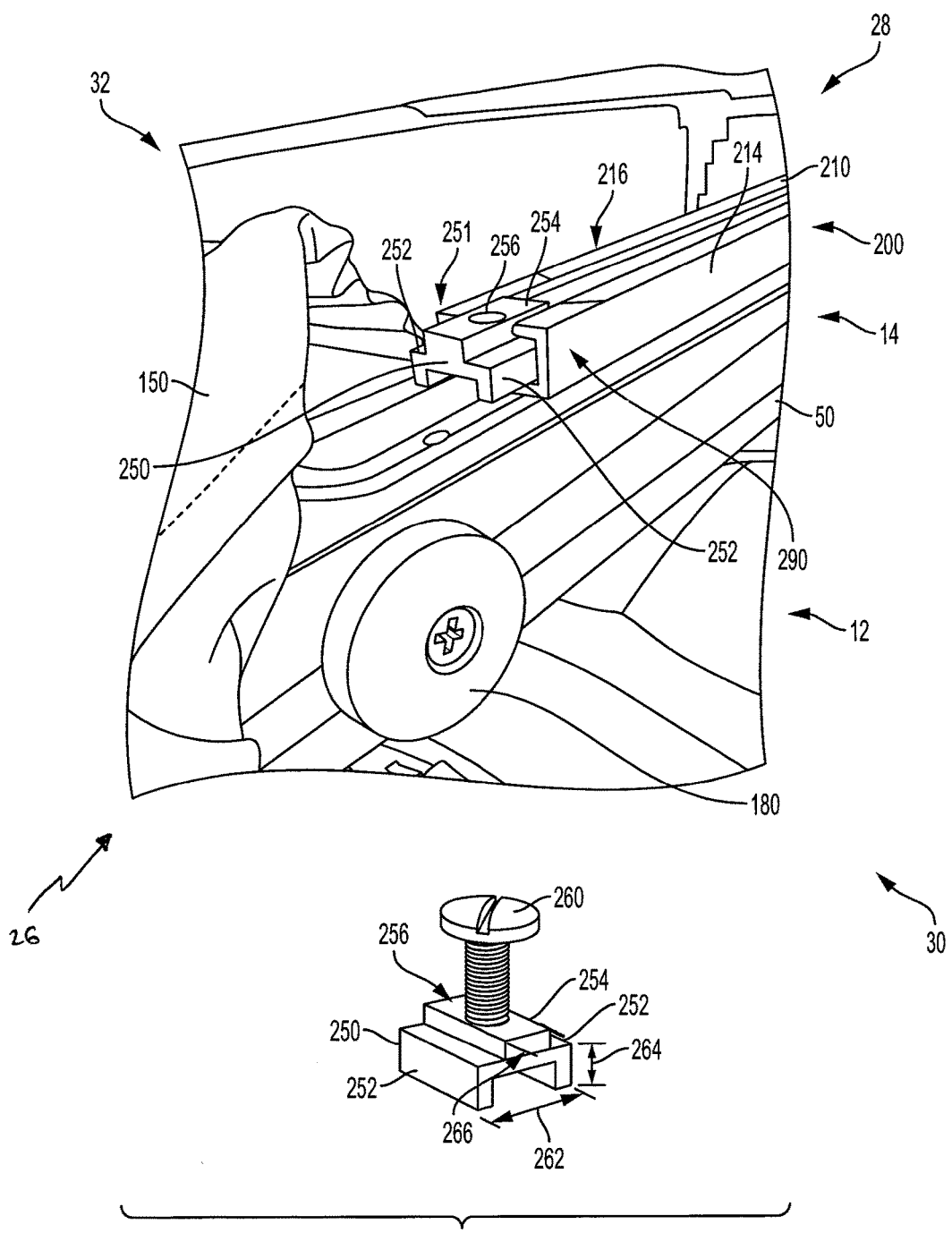
FIG. 12 illustrates track glides.

FIG. 12 illustrates a track glide 250 inserted 251 into cover track 210 (track glide 250 is one representative example of one or more track glides 250 that may be inserted into cover tracks 210). In some embodiments, as shown in FIG. 12, one or more track glides 250 may be inserted into cover track 210 from one or both ends 290 of a cover track 210. Track glide 250 includes a glide portion 252, a protrusion portion 254, a threaded portion 256, and/or other portions. Glide portion 252 is configured to ride within cover track 210 and glide back and forth within cover track 210 toward and away from first end 26 and second end 28 of vehicle 12. Glide portion has a base width 262 that is narrower than transverse track width 212 but wider than slot width 222 (shown in FIG. 11). This may allow track glide 250 to move back and forth in cover track 210 and facilitate coupling with cover 16 without track glide 250 falling out of and/or otherwise decoupling from cover track 210. In some embodiments, base width 262 is up to about 0.75 inches. In some embodiments, width 262 is between about 0.5 inches and about 0.75 inches. In some embodiments, width 262 is about 0.625 inches. Glide portion has a height 264 that is less than track height 218 (shown in FIG. 11). In some embodiments, height 264 is up to about 0.375 inches. In some embodiments, height 264 is between about 0.125 inches and about 0.375 inches. In some embodiments, height 264 is about 0.25 inches. Protrusion portion 254 is configured to extend through the slot formed by slot width 222 (and thus has a width 266 that is less than slot width 222). Threaded portion 256 may be formed in protrusion portion 254 and configured to receive one or more threaded screws 260.

Figure 13:
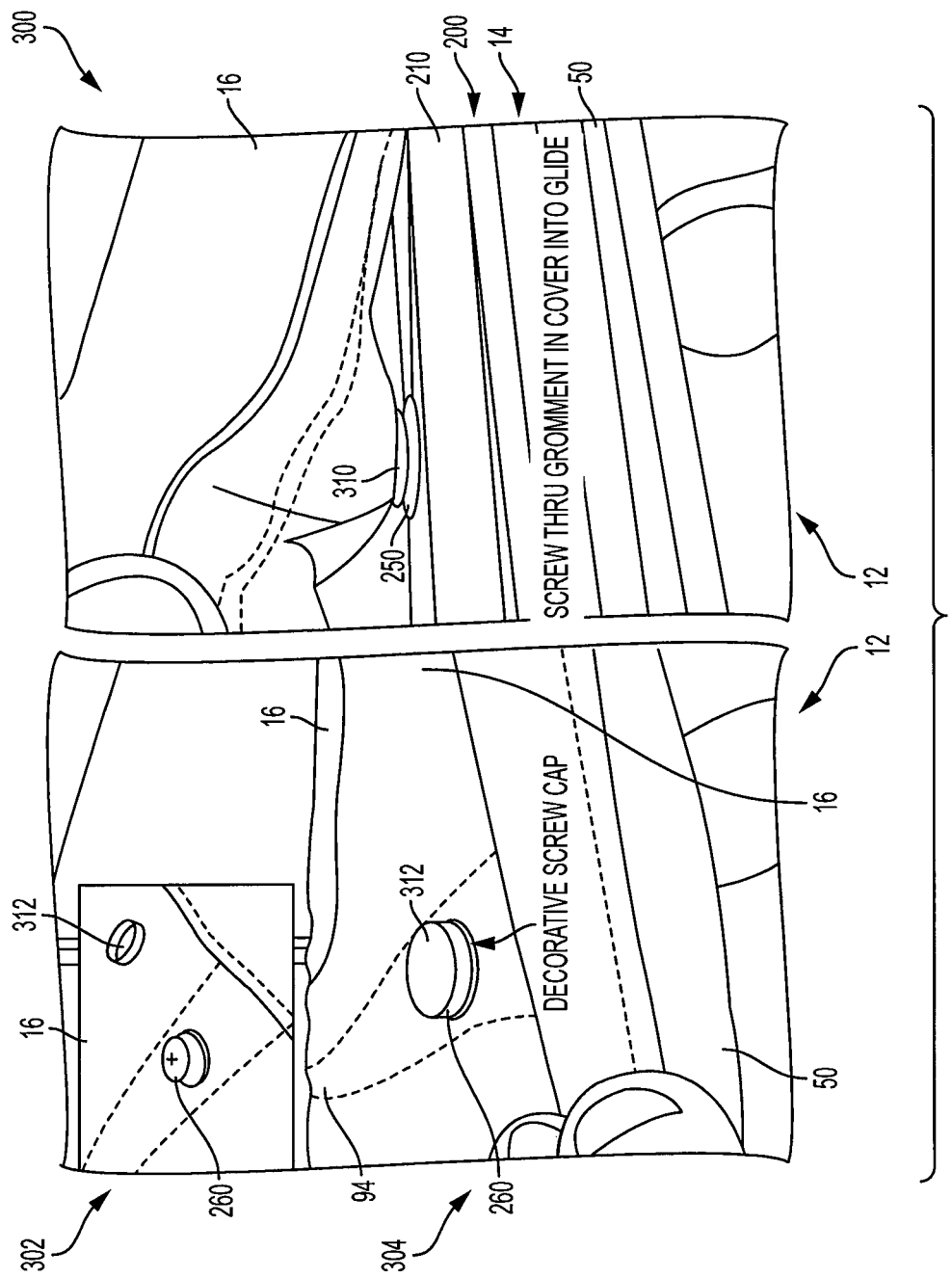
FIG. 13 illustrates three views of a threaded screw coupled with the cover such that a track glide guides movement of the cover along the cover track.

As shown in FIG. 13, the one or more threaded screws may be coupled with cover 16 such that track glide 250 (shown within cover track 210 in FIG. 13) guides movement of cover 16 along cover track 210. FIG. 13 illustrates three views 300, 302, 304 of a threaded screw 260 coupled with cover 16 such that track glide 250 guides movement of cover 16 along cover track 210. View 300 illustrates a threaded screw 260 coupled with cover 16 (within cover 16) via a grommet 310, and coupled with track glide 250 (within cover track 210) as described above to guide movement of cover 16 along cover guide 200. View 302 illustrates a head of threaded screw 260 protruding through cover 16 above cover guide 200/cover track 210 and first side rail 50. View 304 illustrates a decorative screw cap 312 coupled with the head of threaded screw 260. As shown in view 304, cover 16 is coupled to cover track 210 at a location of a channel 94 on cover 16. It should be noted that FIG. 13 illustrates one example location of cover 16 coupled with cover track 210 via threaded screw 260 and track glide 250. In some embodiments, system 10 includes multiple couplings between cover 16 and cover tracks 210 (e.g., a first cover track 210 coupled with first side rail 50 and a second cover track 210 coupled with second side rail 52) in multiple channels 94 via multiple threaded screws 260 and multiple track glides 250 (e.g., along both first side rail 50 and second side rail 52 (shown in FIG. 1)).

Figure 14:
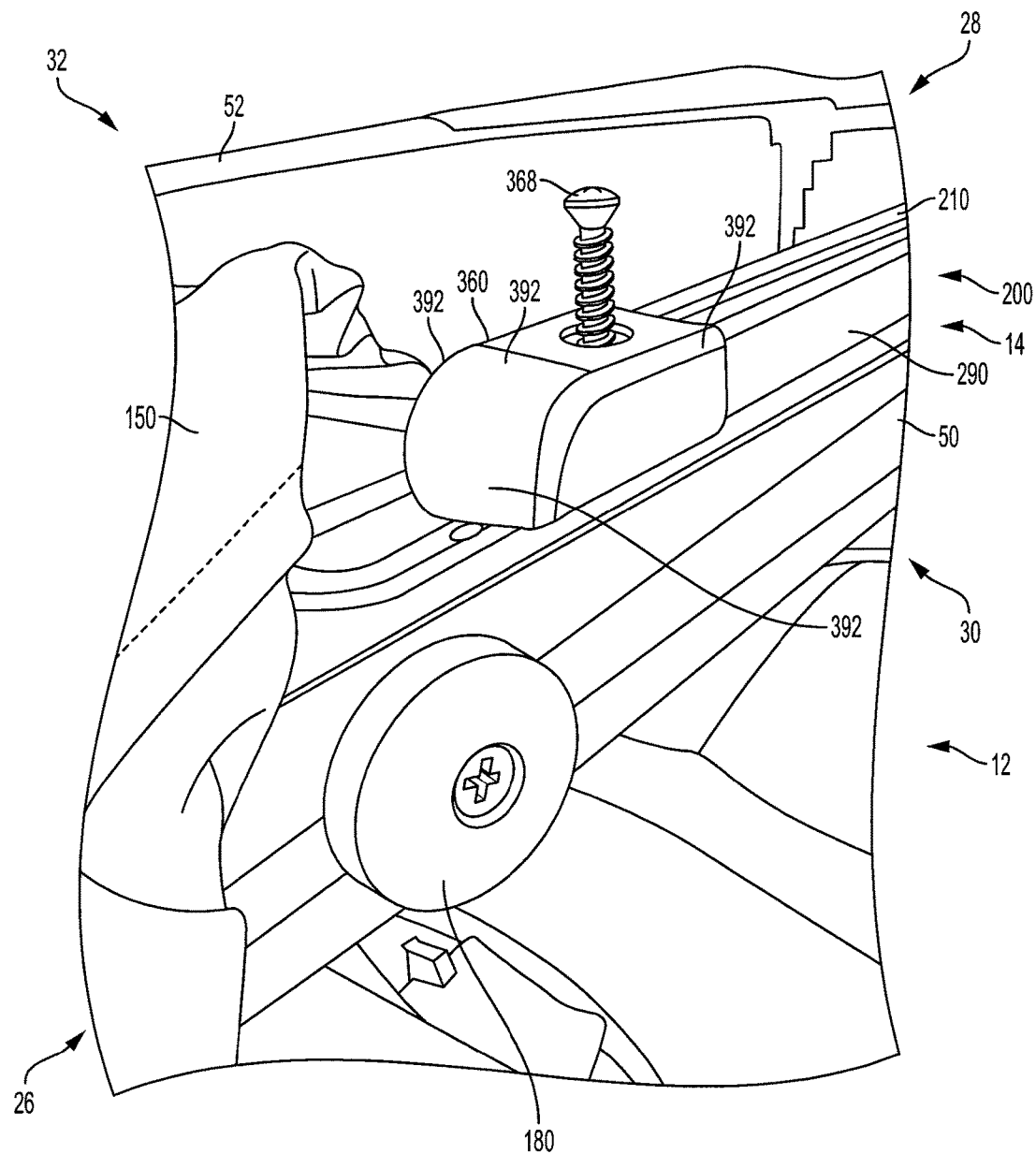
FIG. 14 illustrates a track end cap coupled with and/or otherwise attached to the first side rail at or near an end of the cover track.

FIG. 14 illustrates a track end cap 360 coupled with and/or otherwise attached to first side rail 50 at or near end 290 of cover track 210. Track end cap 360 may be attached to first side rail 50 via screws, nuts, bolts, adhesive, welding, and/or other coupling devices and/or methods. In FIG. 14, track end cap 360 is coupled with first side rail 50 at end 290 of cover track 210 via a screw 368 (but this is not intended to be limiting). End cap 360 is configured to prevent track glides 250 (FIG. 13) from sliding out of cover track 210. (Track glides 250 may be inserted into cover track 210 before end cap 360 is installed, for example.) In some embodiments, one or more portions of end cap 360 may be shaped like a rectangular prism and/or have other shapes. In some embodiments, end cap 360 includes one or more rounded edges and/or surfaces 392 and/or other features that substantially prevent cover 16 (shown in FIG. 1) from catching on end cap 360 and/or cover track 210 when cover 16 is moved along cover track 210. For example, an end of end cap 360 toward first end 26 of vehicle 12 may be tapered and/or otherwise sloped toward the first end 26. Other end caps may be similarly shaped according to their position in system 10. For example, at an end of cover track 210 toward second end 28 of vehicle 12, an end cap 360 may be tapered in substantially the opposite direction relative to the endcap shown in FIG. 14. In some embodiments, track end caps 360 are attached at both ends 290 of cover tracks 210 on both first and second side rails 50 and 52 (shown in FIG. 1).

Figure 15:
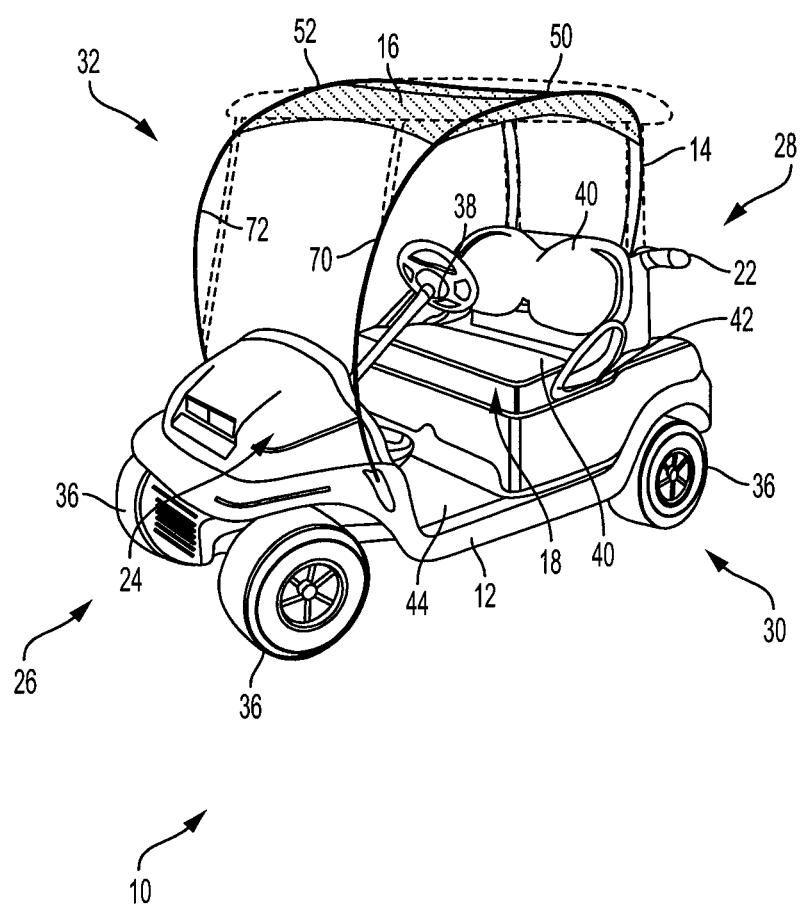
FIG. 15 illustrates a second possible embodiment of the system.
Figure 16:
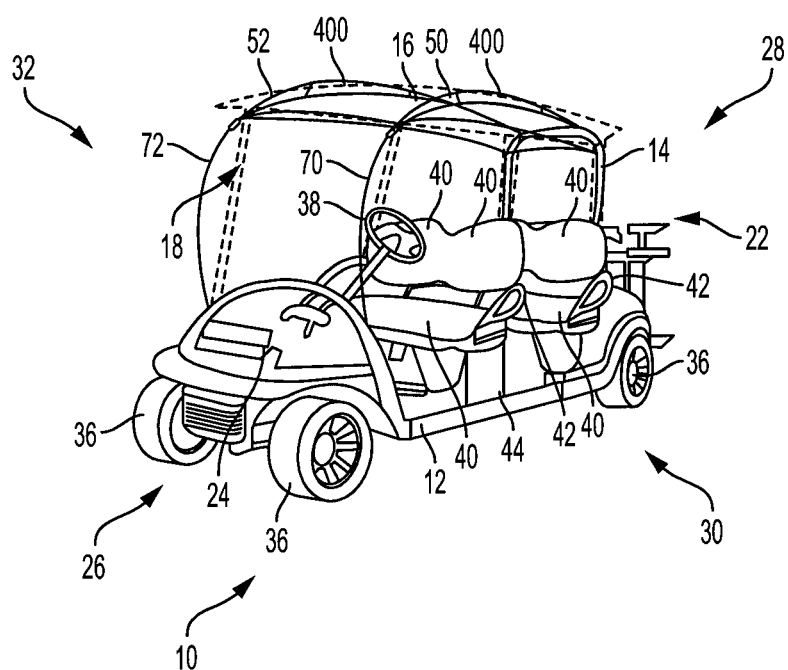
FIG. 16 illustrates a third possible embodiment of the system.
Figure 17:
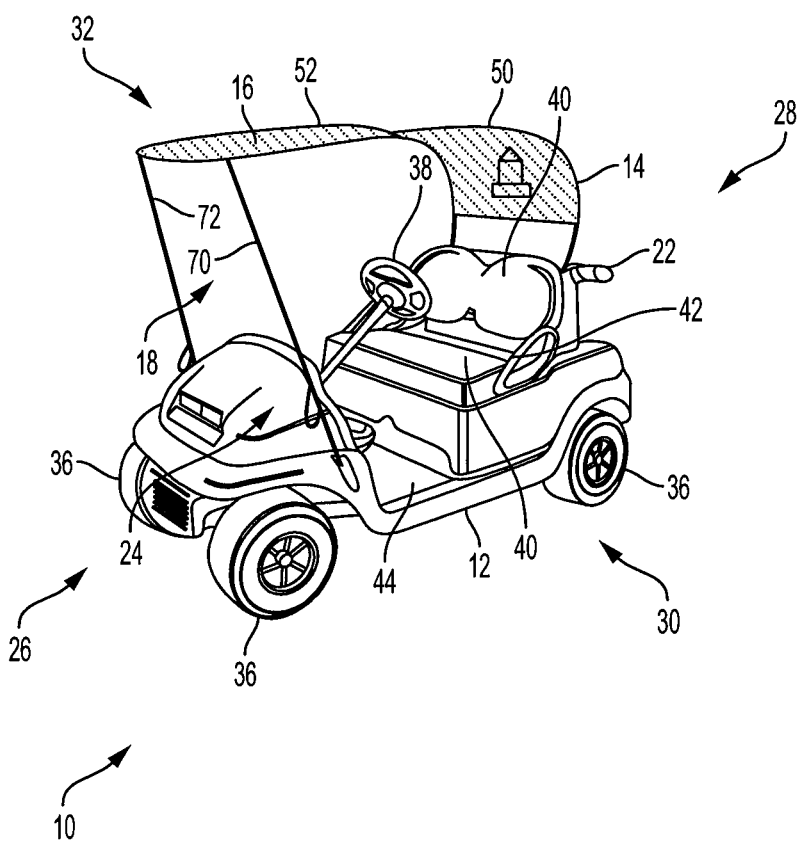
FIG. 17 illustrates a fourth possible embodiment of the system.

FIG. 15-17 illustrate other possible example embodiments of system 10. In the embodiments shown in FIG. 15-17 cover 16 is a flexible canopy that covers occupant space 18 of vehicle 12. The flexible canopy may be removed from frame 14 and folded up, for example. In the embodiment shown in FIG. 15 side rails 50 and/or 52 and support members 70 and/or 72 are formed by flexible poles that couple with frame 14 at or near second end 28 of vehicle 12 and extend having an arcuate shape toward first end 26. The flexible poles are coupled with vehicle 12 at or near corners 54 and 58 of vehicle 12. In the embodiment shown in FIG. 16, cover 16 includes sleeves 400 configured to receive side rails 50 and 52 and support members 70 and 72 (which are formed by flexible poles that couple with frame 14 at or near second end 28 of vehicle 12 and extend having an arcuate shape toward first end 26). In the embodiment shown in FIG. 17, cover 16 and/or side rails 50 and 52 may be formed by a single collapsible photography background like canopy that couples with vehicle 12 at or near second side 28 and is supported by support members 70 and/or 72 above corners 54 and 58 at or near first end 26 of vehicle 12. In some embodiments, this canopy may be up to about 90 inches long and/or up to about 70 inches wide. In some embodiments, this canopy may be up to about 78 inches long and/or up to about 59 inches wide.

Figure 18:
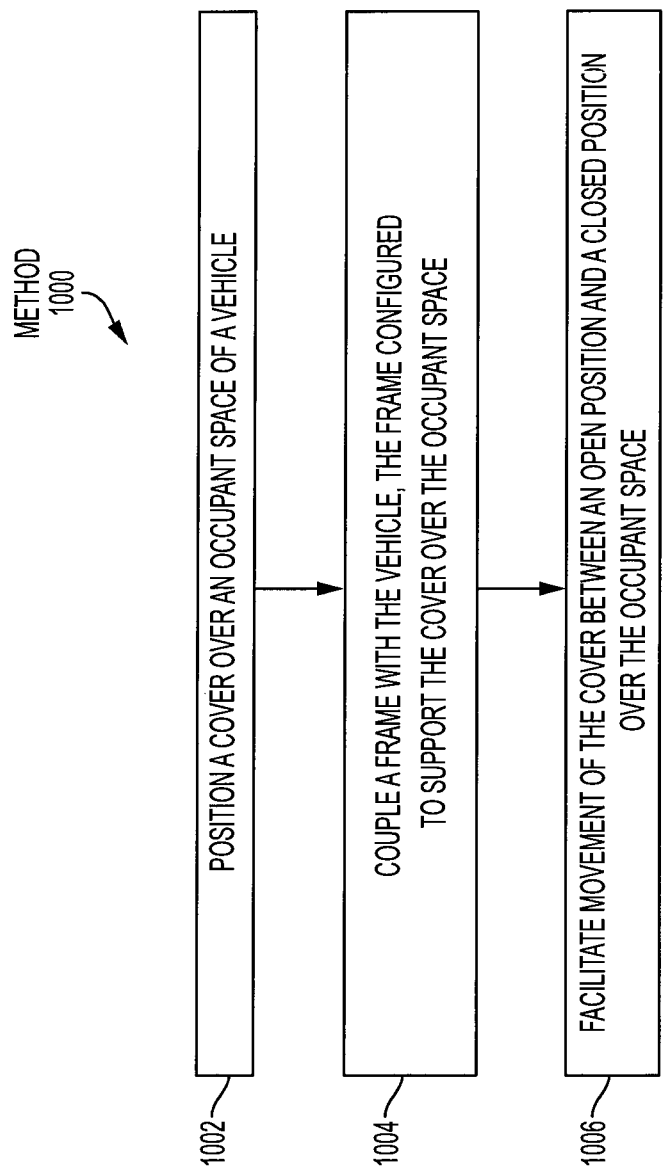
FIG. 18 illustrates a method for moving a retractable roof vehicle system between an open position and a closed position over an occupant space of an open sided vehicle.

FIG. 18 illustrates a method 1000 for moving a retractable roof vehicle system between an open position and a closed position over an occupant space of an open sided vehicle. The retractable roof vehicle system comprises the open sided vehicle, a cover, a frame, and/or other components. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 18 and described below is not intended to be limiting.

At an operation 1002, the cover is positioned over an occupant space of the open sided vehicle. The open sided vehicle has an occupant space for one or more occupants of the vehicle. In some embodiments, the open sided vehicle is a golf cart, an all-terrain vehicle (ATV), and/or other vehicles. The cover is configured to at least partially shield the occupant space from ambient environmental conditions. In some embodiments, the cover comprises two or more individual sections that extend from a first side rail of the frame to a second side rail of the frame. The individual sections may move in an accordion like motion along the first and second side rails toward or away from an end of the vehicle to facilitate movement of the cover between an open position and a closed position. In some embodiments, the cover comprises one or more channels formed between the individual sections. The channels may be substantially perpendicular to the first and second side rails. The channels may be configured to facilitate moisture removal from the cover toward the first and second side rails when the cover is in the closed position. In some embodiments, the individual sections include arcuate shaped structural elements. The arcuate shaped structural elements are configured to give the individual sections an arcuate shape and facilitate formation of the channels between the individual sections such that the cover has a corrugated appearance. In some embodiments, the cover comprises a first material layer, a second material layer, and the individual arcuate shaped structural elements. A given arcuate shaped structural element is positioned between the first material layer and the second material layer and extends from the first side rail to the second side rail in an individual section of the cover. Operation 1002 may be performed by a cover that is the same as or similar to cover 16 (shown in FIG. 1 and described herein).

At an operation 1004, the frame is coupled with the vehicle. The frame is configured to support the cover over the occupant space. The frame comprises the first side rail and the second side rail. The side rails are positioned along opposing sides of the vehicle over the occupant space. The first and second side rails both form and/or are coupled with cover guides configured to guide movement of the cover between an open position and a closed position. Operation 1004 may be performed by a frame that is the same as or similar to frame 14 (shown in FIG. 1 and described herein).

At an operation 1006, movement of the cover between the open position and the closed position over the occupant space is facilitated. In some embodiments, the cover and the frame include corresponding magnetic components configured to removably secure the cover in the closed position. In some embodiments, the first and second side rails are configured such that the cover guides are tracks formed in and/or coupled to the first and second side rails. One or more portions of the cover may ride within the tracks to facilitate movement of the cover between the open position and the closed position. Operation 1006 may be performed by a frame and a cover that are the same as or similar to frame 14 and cover 16 (shown in FIG. 1 and described herein).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A retractable roof vehicle system, the system comprising:
   an open sided vehicle having an occupant space for one or more occupants of the vehicle;
   a cover configured to at least partially shield the occupant space from ambient environmental conditions, the cover positioned over the occupant space of the vehicle, the cover configured to be moved between an open position and a closed position over the occupant space; and
   a frame coupled with the vehicle configured to support the cover over the occupant space, the frame comprising a first side rail and a second side rail positioned along opposing sides of the vehicle over the occupant space, the first and second side rails both coupled with cover guides configured to guide movement of the cover between the open position and the closed position,
   wherein, the cover comprises two or more structural elements configured to give the cover a corrugated configuration, individual ones of the structural elements having apexes that extend between the first side rail and the second side rail such that the individual sections move in an accordion like motion along the first and second side rails toward or away from an end of the vehicle to facilitate movement of the cover between the open position and the closed position.

2. The system of claim 1, wherein the cover and the frame include corresponding magnetic components configured to removably secure the cover in the closed position.

3. The system of claim 1, wherein the first and second side rails are configured such that the cover guides are tracks coupled with the first and second side rails, and wherein one or more portions of the cover ride within the tracks to facilitate movement of the cover between the open position and the closed position.

4. The system of claim 1, wherein the cover comprises two or more individual sections that extend from the first side rail to the second side rail, the two or more sections corresponding to the two or more structural elements.

5. The system of claim 4, wherein the two or more structural elements comprise arcuate shaped structural elements.

6. The system of claim 4, wherein the cover further comprises one or more channels formed between the individual sections substantially perpendicular to the first and second side rails, the channels configured to facilitate moisture removal from the cover toward the first and second side rails when the cover is in the closed position.

7. The system of claim 1, wherein the vehicle is a golf cart.

8. The system of claim 1, wherein the vehicle is an all-terrain vehicle.

9. The system of claim 1, further comprising a strap coupled to the cover configured to be grasped by an occupant of the vehicle to move the cover between the open position and the closed position.

10. The system of claim 1, further comprising end caps coupled to ends of the first side rail and the second side rail configured to prevent the cover guides from decoupling from the first and second side rails.

11. A retractable roof vehicle system, the system comprising:
an open sided vehicle having an occupant space for one or more occupants of the vehicle;
a cover configured to at least partially shield the occupant space from ambient environmental conditions, the cover positioned over the occupant space of the vehicle, the cover configured to be moved between an open position and a closed position over the occupant space; and
a frame coupled with the vehicle configured to support the cover over the occupant space, the frame comprising a first side rail and a second side rail positioned along opposing sides of the vehicle over the occupant space, the first and second side rails both coupled with cover guides configured to guide movement of the cover between the open position and the closed position,
wherein, the cover comprises two or more structural elements configured to give the cover a corrugated configuration, individual ones of the structural elements having apexes that extend between the first side rail and the second side rail such that the individual sections move in an accordion like motion along the first and second side rails toward or away from an end of the vehicle to facilitate movement of the cover between the open position and the closed position;
wherein the cover comprises two or more individual sections that extend from the first side rail to the second side rail, the two or more sections corresponding to the two or more structural elements;
wherein the two or more structural elements comprise arcuate shaped structural elements; and
wherein the individual sections include the arcuate shaped structural elements, the arcuate shaped structural elements further comprising non-arcuate extension portions extending from ends of the arcuate shaped structural elements, the non-arcuate extension portions configured to facilitate formation of channels between the individual sections.

12. The system of claim 11, wherein the arcuate shaped structural elements are configured to give the individual sections an arcuate shape and facilitate formation of the channels between the individual sections such that the cover has the corrugated configuration.

13. The system of claim 12, wherein the cover further comprises a first material layer, a second material layer, and the two or more arcuate shaped structural elements, wherein a given arcuate shaped structural element is positioned between the first material layer and the second material layer, and extends from the first side rail to the second side rail between two channels in an individual section of the cover.

14. A method for assembling a retractable roof vehicle system having an open position and a closed position over an occupant space of an open sided vehicle, the retractable roof vehicle system comprising the open sided vehicle, a cover, and a frame, the method comprising:
positioning the cover over the occupant space of the vehicle, the occupant space being configured for one or more occupants of the vehicle, the cover configured to at least partially shield the occupant space from ambient environmental conditions, the cover configured to be moved between the open position and the closed position over the occupant space; and
coupling the frame with the vehicle, the frame configured to support the cover over the occupant space, the frame comprising a first side rail and a second side rail positioned along opposing sides of the vehicle over the occupant space, the first and second side rails both coupled with cover guides configured to guide movement of the cover between the open position and the closed position,
wherein, the cover comprises two or more structural elements configured to give the cover a corrugated configuration, individual ones of the structural elements having apexes that extend between the first side rail and the second side rail such that the individual sections move in an accordion like motion along the first and second side rails toward or away from an end of the vehicle to facilitate movement of the cover between the open position and the closed position.

15. The method of claim 14, further comprising removably securing the cover in the closed position with corresponding magnetic components included in the cover and the frame.

16. The method of claim 14, wherein the cover guides are tracks coupled with the first and second side rails, and wherein one or more portions of the cover ride within the tracks to facilitate movement of the cover between the open position and the closed position.

17. The method of claim 14, further comprising forming two or more individual sections in the cover that extend from the first side rail to the second side rail, the two or more sections corresponding to the two or more structural elements.

18. The method of claim 17, further comprising forming one or more channels between the individual sections substantially perpendicular to the first and second side rails, the channels configured to facilitate moisture removal from the cover toward the first and second side rails when the cover is in the closed position.

19. The method of claim 17, wherein the individual sections include arcuate shaped structural elements.

20. The method of claim 19, wherein the arcuate shaped structural elements are configured to give the individual sections an arcuate shape and facilitate formation of channels between the individual sections such that the cover has a corrugated appearance.

21. The method of claim 17, wherein the cover comprises a first material layer, a second material layer, and individual arcuate shaped structural elements, wherein a given arcuate shaped structural element is positioned between the first material layer and the second material layer and extends from the first side rail to the second side rail in an individual section of the cover.

22. The method of claim 14, wherein the vehicle is a golf cart.

23. The method of claim 14, wherein the vehicle is an all-terrain vehicle.

* * * * *